(12) United States Patent
Church et al.

(10) Patent No.: US 10,423,285 B2
(45) Date of Patent: Sep. 24, 2019

(54) TOUCH SENSOR

(71) Applicant: Solomon Systech Limited, Hong Kong (HK)

(72) Inventors: Justin Anthony Church, Whiteley (GB); David Brent Guard, Whiteley (GB)

(73) Assignee: Solomon Systech Limited, Hong Kong (HK)

( * ) Notice: Subject to any disclaimer, the term of this patent is extended or adjusted under 35 U.S.C. 154(b) by 0 days.

(21) Appl. No.: 15/886,863

(22) Filed: Feb. 2, 2018

(65) Prior Publication Data

US 2018/0224965 A1 Aug. 9, 2018

(30) Foreign Application Priority Data

Feb. 9, 2017 (GB) .................... 1702116.3

(51) Int. Cl.
*G06F 3/044* (2006.01)
*G06F 3/047* (2006.01)
*G06F 3/0354* (2013.01)

(52) U.S. Cl.
CPC .......... *G06F 3/044* (2013.01); *G06F 3/03547* (2013.01); *G06F 3/047* (2013.01); *G06F 2203/04103* (2013.01); *G06F 2203/04112* (2013.01)

(58) Field of Classification Search
CPC .................. G06F 3/044; G06F 3/0412; G06F 2203/04112; G02F 1/13338
See application file for complete search history.

(56) References Cited

U.S. PATENT DOCUMENTS

| 2009/0194344 | A1 | 8/2009 | Harley et al. | |
| 2010/0156810 | A1 | 6/2010 | Barbier | |
| 2010/0302201 | A1* | 12/2010 | Ritter | G06F 3/044 345/174 |
| 2013/0155012 | A1 | 6/2013 | Chang | |
| 2014/0168147 | A1 | 6/2014 | Huang | |
| 2014/0226089 | A1 | 8/2014 | Guard | |
| 2015/0153862 | A1* | 6/2015 | Nakamura | G06F 3/041 345/173 |
| 2015/0227230 | A1* | 8/2015 | Cok | G06F 3/044 345/174 |
| 2016/0259481 | A1 | 9/2016 | Lee | |
| 2016/0299627 | A1* | 10/2016 | Yang | G06F 3/044 |

* cited by examiner

*Primary Examiner* — Gerald Johnson
(74) *Attorney, Agent, or Firm* — Idea Intellectual Limited; Margaret A. Burke; Sam T. Yip

(57) ABSTRACT

In a capacitive touch sensor device, to avoid floating touches causing signal inversion in mutual capacitance measurements, an electrode pattern is used of the type in which the mutual capacitance arises primarily from co-extending electrode portions of the drive and sense electrodes separated by a gap G. The pattern is dimensioned such that the sum of the gap G between co-extending drive and sense electrode portions and the widths Wy of the sense electrodes is made sufficiently small to avoid signal inversion. Namely, the width, Wy, plus the gap, G, is made less than or equal to one of: 4, 3 or 2 times the distance from the touch sensor electrodes to the touch surface, this distance being the touch panel thickness, h.

22 Claims, 19 Drawing Sheets

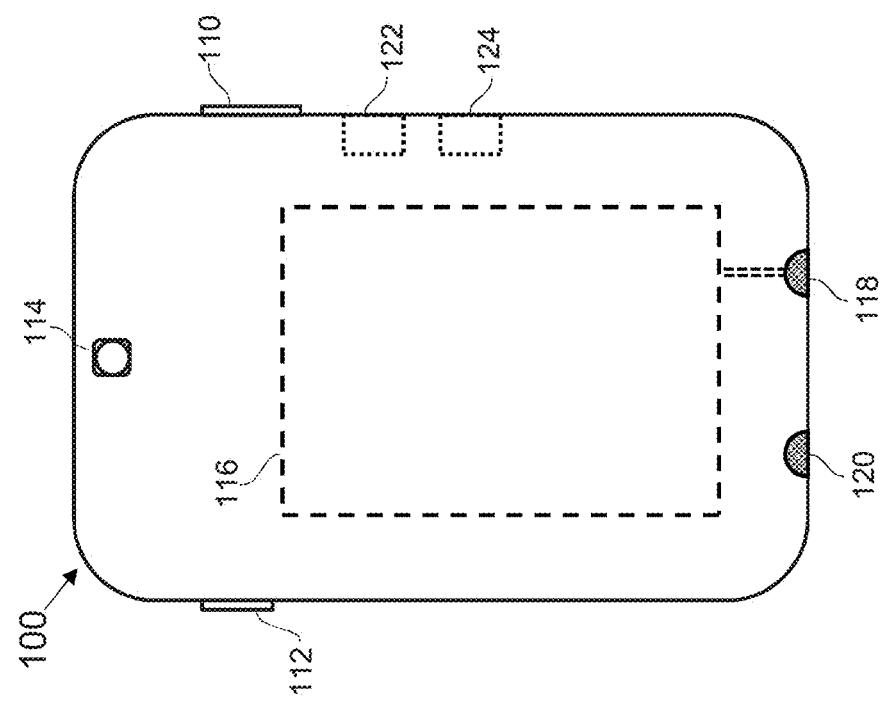
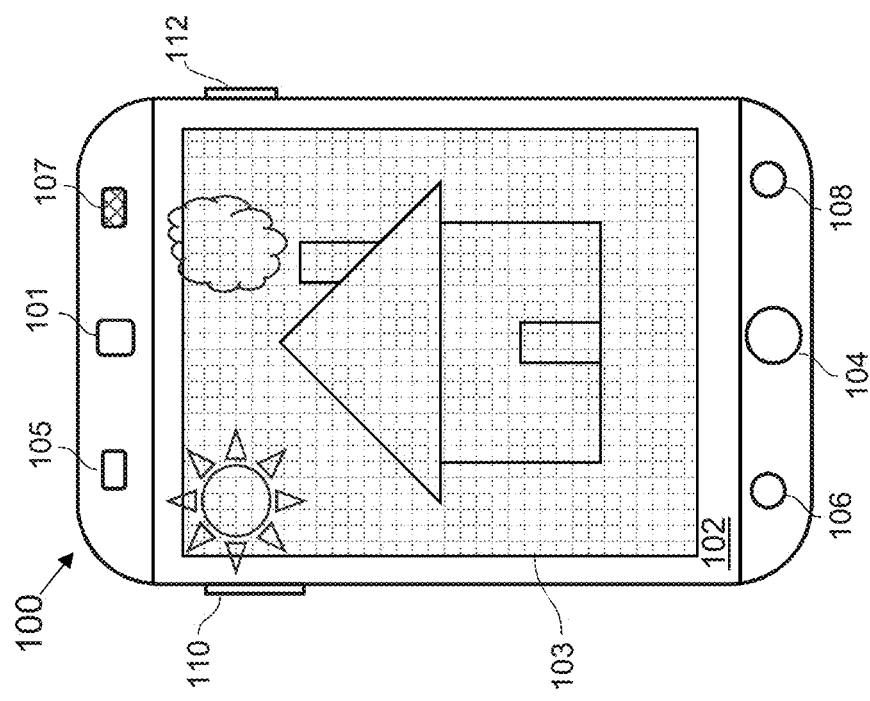

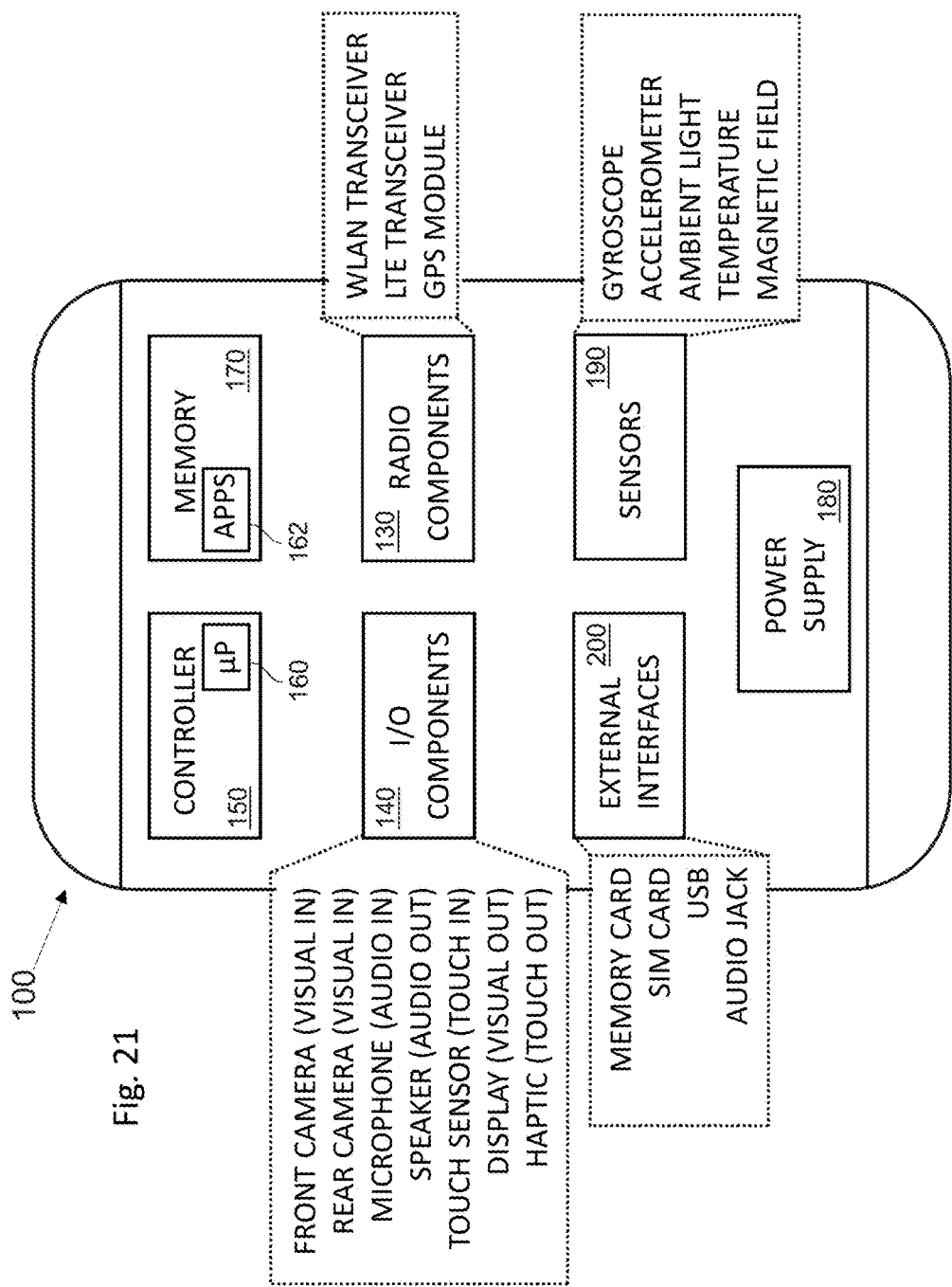

TOUCH SENSOR

CROSS-REFERENCE TO THE RELATED APPLICATION

This application claims priority to the United Kingdom Patent Application No. GB1702116.3, filed Feb. 9, 2017, the disclosure of which is incorporated herein by reference in their entirety.

FIELD OF THE INVENTION

The present disclosure relates to position-sensitive capacitive touch sensors, more especially, but not exclusively, to capacitive touch sensors integrated with displays to form touch screens.

BACKGROUND

A capacitive touch sensor, referred to simply as a touch sensor in the following, may detect the presence and location of a touch or the proximity of an object (such as a user's finger or a stylus) on a surface. Touch sensors are often combined with a display to produce a touch screen. For a touch screen, the most common display technologies currently are thin film transistor (TFT) liquid crystal displays (LCDs) and organic light emitting diode (OLED) displays. In other devices, the touch sensors are not combined with a display, e.g. a touch pad of a laptop computer. A touch screen enables a user to interact directly with what is displayed on the screen through a graphical user interface (GUI), rather than indirectly with a mouse or touch pad. A touch sensor may be attached to or provided as part of a mobile phone, tablet or laptop computer, for example.

Touch sensors may be classified into grid and matrix types. In a matrix type, an array of electrodes is arranged on the surface which are electrically isolated from each other, so that each electrode in the array provides its own touch signal. A matrix type touch sensor is therefore naturally suited to situations in which an array of touch-sensitive buttons is needed, such as in a control interface, data entry interface or calculator. In a grid type, there are two groups of parallel electrodes, usually referred to as X and Y electrodes, since they are typically arranged orthogonal to each other. A number of nodes are defined by the crossing points of pairs of X and Y electrodes (as viewed in plan view), where the number of nodes is the product of the number of X electrodes and Y electrodes. A grid type touch sensor is the type typically used for touch screens on mobile phones, drawing tablets and so forth. In earlier designs, the X and Y electrodes are arranged either side of a dielectric layer, so they are vertically offset from each other by the thickness of the dielectric layer, vertical meaning orthogonal to the plane of the layers. In more recent designs, to reduce overall thickness, the X and Y electrodes are deposited on the same side of a dielectric layer, i.e. in a single layer, with thin films of dielectric material being locally deposited at the cross-overs to avoid shorting between the X and Y electrodes. A single electrode layer design of this kind is disclosed in US 2010/156810 A1, the entire contents of which are incorporated herein by reference.

Touch sensors may also be classified into self capacitance and mutual capacitance types.

In a self capacitance measurement, the capacitance being measured is between an electrode under a dielectric touch panel and the touching finger, stylus etc., or more precisely the effect that the touch's increase in capacitance with the electrode has on charging a measurement capacitor that forms part of the touch IC's measurement circuit. The finger and the electrode can thus be thought of as acting as the plates of a capacitor with the touch panel being the dielectric.

In a mutual capacitance measurement, adjacent pairs of electrodes are arranged under the touch panel, and form the nominal plates of the capacitor. A touching body acts to modify the capacitance associated with the electrode pair by replacing what was the ambient environment, i.e. in most cases air, but possibly water or some other gas or liquid, with the touching object, which may be effectively a dielectric material (e.g. a dry finger, or a plastics stylus) or in some cases could be conductive (e.g. a wet finger, or a metal stylus). One of the pair of electrodes is driven with a drive signal, e.g. with a burst of pulses, and the other electrode of the pair senses the drive signal. The effect of the touch is to attenuate or amplify the drive signal received at the sense electrode, i.e. affects the amount of charge collected at the sense electrode. Changes in the mutual capacitance between a drive electrode and a sense electrode provide the measurement signal. It is noted that in a mutual capacitance grid sensor, there is a convention to label drive electrodes as the X electrodes and sense electrodes as the Y electrodes, although this choice is arbitrary. A perhaps clearer labelling that is often used is to label the drive electrodes as "Tx" for transmission and the sense electrodes as "Rx" for receiver in analogy to telecoms notation, although this labelling is of course specific to mutual capacitance measurements.

Current industry standard touch screens for mobile phones rely on operating the same touch sensor to make both self capacitance and mutual capacitance measurements, since acquiring both is beneficial to gaining additional information about the touch which can be used in post-processing to increase the reliability of interpretation. For example, mutual capacitance measurement have high noise immunity, whereas self capacitance measurements are easier to interpret and give a direct measure of moisture presence.

FIG. 1A is a schematic cross-section through a touch panel in a plane perpendicular to the plane of the stack showing a mutual capacitance measurement involving an individual pair of X (drive) and Y (sense) electrodes: X, Y. Electric field lines are shown schematically with the arrow-headed, curved lines.

FIG. 1B is a schematic cross-section through the same touch panel as FIG. 1A in the same plane showing a self capacitance measurement involving the same pair of X and Y electrodes: X, Y. Electric field lines are shown schematically with the arrow-headed lines.

In touch screen design, there is a continuing trend towards making the display and sensor stack thinner so the whole phone, tablet etc. can be as thin as possible. Generally, a thinner stack means that the display layers, in particular the display drive electrodes are brought closer to the touch sensor layers, in particular the touch sensor electrodes. There is also a desire to make the touch panel thinner, although this is motivated by a desire to reduce cost (since the touch panel material is expensive) or to provide for flexibility of the display stack.

A side effect of bringing the display ever closer to the touch sensor electrodes, is that there is ever larger self capacitance between the touch sensor electrodes and the display electrodes. An unwanted consequence of the proximity of the display electrodes to the touch sensor electrodes is signal inversion of poorly grounded touches in mutual capacitance measurements. When a touch is received from a finger or other touching object which is not well grounded to the system ground, this is referred to as a floating touch, as opposed to a grounded touch. A floating touch is defined as one having a low self capacitance to the system ground, and a grounded touch is defined as one having a high self capacitance to the system ground. In a mobile phone or other handheld device, the system ground may be constituted by the device chassis or housing, and/or by the display electrodes. If a user is holding the device, then the user, and hence his or her touches, can be expected to be well grounded. However, if the device is not being held, e.g. lying on a well insulated object such as a wooden desk top or a fabric car seat, then the device itself is electrically isolated, so grounding of a touch will be dependent on the touch being able to find a ground to the device itself.

A floating touch can cause an undesired increase in mutual capacitance between drive and sense electrodes in a touch sensor layer, instead of the usual, desired decrease. The sign of the touch signal is thus inverted. A concrete example has a touch sensor electrode configuration with co-planar X and Y electrodes arranged 0.12 mm above the display electrodes. The X and Y electrodes are both the same size at 6×3 mm and arranged adjacent to each other along their 6 mm sides separated by a gap of 0.135 mm. The touch panel thickness is 0.1 mm. All dielectric permittivities are taken to be 3.5 or 4.0 for the various dielectric layers including the touch panel. Other parameters are set to typical representative values. With this example, we find that when a grounded touch of 4 mm diameter touches the touch surface, then the mutual capacitance reduces to approximately half the no-touch value. More specifically, when there is a no-touch mutual capacitance of approximately 200 fF, which reduces to about 100 fF with the grounded touch. On the other hand, with a floating touch of the same size, the mutual capacitance increases to approximately 600 fF, i.e. increases to 3 times the no-touch value. In any given touch sensor and display combination, i.e. touch screen stack, simulations or testing can be used to determine, based on touch size and grounding state of the touch, whether the mutual capacitance change will be positive or negative. Because of its predictability and reproducibility, this effect can be dealt with in post-processing by the touch-sensor controller chip. A self capacitance measurement can be used to detect how well a touch is grounded, and this information can be used as an aid when analysing the mutual capacitance measurement data. However, in thin sensor and display stacks, the ability to carry out self capacitance measurements is compromised, since the proximity of the display electrodes to the touch sensor electrodes can lead to the capacitance between touching object and touch sensor electrode becoming much smaller than that between the display electrodes and the touch sensor electrodes. Consequently, there may be no accurate self capacitance measurements available to use as a post-processing aid to detecting signal inversion in the mutual capacitance measurements.

BRIEF SUMMARY OF THE INVENTION

According to one aspect of the disclosure, there is provided a device incorporating a capacitive touch sensor, the device comprising:

a touch panel having on an upper side a touch surface and on a lower side an internal surface, the touch panel being made of a dielectric material and having a thickness, h, of less than or equal to 400 micrometers;

drive and sense touch sensor electrodes, labelled X and Y respectively, arranged under the touch panel so as to cross each other at crossing points to form a two-dimensional array of nodes, the X and Y electrodes of each node comprising mutually co-extending X and Y electrode portions of respective widths, Wx and Wy, that are separated by a gap, G, suitable for making a mutual capacitance measurement of a touching object impinging on the touch surface, wherein the width, Wy, of the co-extending Y electrode portions plus the gap, G, between co-extending X and Y electrode portions is less than or equal to one of: 4, 3 or 2 times the thickness, h, of the touch panel.

In some embodiments, at each node the co-extending X and Y electrode portions separated by the gap G are arranged in groups, each group being separated by a distance of at least one of 2, 3, 4 or 5 times the gap G, so that the mutual capacitance between groups is smaller than the mutual capacitance within groups.

In some embodiments, the width, Wx, of the co-extending X electrode portions is within a range of at least one of: ⅕ to 5 times; ¼ to 4 times; ½ to 2 times the width Wy of the co-extending Y electrode portions.

In some embodiments, the thickness, h, of the touch panel is less than or equal to at least one of: 350, 300, 250, 200, 150 or 100 micrometers (i.e. microns or µm).

The device further comprises a display, such as an LCD or OLED display, configured to operate in conjunction with the capacitive touch sensor and thereby form a touch screen. The display will have electrodes and in some embodiments these are arranged so that the uppermost one of the display electrode layers is separated from the lower of the X and Y electrode layers by a distance of less than or equal to one of 600, 500, 400, 300, 200 and 100 micrometers. Here we note that in the special case of an in-cell stack in which the VCOM electrode layer also functions as the X (drive) electrode layer through time multiplexing, this dual function layer is considered to be the X (drive) electrode layer for the purposes of defining the X-electrode-to-uppermost-display-electrode separation distance.

The drive and sense (i.e. X and Y) electrodes can be formed in a single layer or respective layers separated by an intermediate layer of a dielectric material. In the latter case, the X electrodes are preferably arranged below the Y electrodes, so that the Y electrodes are closer to the touch panel.

Depending on the electrode pattern, the co-extending higher order X and Y electrode portions comprise at least one of first, second and third order branches of one of the X and Y electrodes and at least one of first, second and third order branches of one of the Y and X electrodes respectively.

The degree of signal inversion mitigation can be specified as desired at the time of designing the device, in particular in relation to small area touches and/or large area touches. For example, the device design parameters, and particular its dimensions, can be selected such that, in a mutual capacitance measurement, a large area touch, such as one covering at least twenty five contiguous array nodes, e.g. a 5×5 array, causes a change in mutual capacitance as measured between the X and Y electrodes of the same sign regardless of the ground condition of the touch. An suitable array size could be used to define a large touch, or even the whole array. The device design parameters, and particular its dimensions, can also or instead be selected in respect of a small touch. Namely, the dimensions of the device can be selected such that, in a mutual capacitance measurement, a small area touch, that is one covering an area less than an area defined by a quadrilateral of four adjacent array nodes, causes a change in mutual capacitance as measured between the X and Y electrodes of the same sign regardless of the ground condition of the touch.

The X and Y electrodes are made of a conductive material and represent a macrostructure. The conductive material in some embodiments forms a continuous sheet. In other embodiments, the conductive material within at least portions of the X and Y electrodes has a microstructure formed of a mesh of the conductive material with micro-areas absent of the conductive material in the mesh.

A particular group of embodiments is based on an electrode pattern for the touch sensor electrodes in which higher order electrode branches interleave or interdigitate, and these interdigitating portions of the electrodes are what dominates the mutual capacitance. This type of electrode pattern provides good design freedom to tailor the electrode dimensions and gaps. In this type of electrode pattern: the X electrodes comprise zeroth order branches extending in the x direction; the Y electrodes comprise zeroth order branches extending in the y direction, such that it is the zeroth order branches of the X and Y electrodes which cross each other, and such that the zeroth order branches of any two adjacent X electrodes and any two adjacent Y electrodes enclose a sub-area; and the X and Y electrodes each further comprising higher order branches of order n, each of which is confined to the sub-area into which it buds, where order n is a positive integer and where an nth order branch buds from an (n−1)th order branch, so that, away from edges of the node array, each node is associated with four sub-areas, and wherein, in each sub-area, the co-extending X and Y electrode portions are at least in part formed by at least some of the higher order X electrode branches and at least some of the higher order Y branches. An advantage of this kind of electrode pattern design is that the number of, size of, and gaps between, co-extending higher order X and Y branches, and in particular the number of interdigitating electrode branches between X and Y, can selected freely as design parameters to arrive at an overall stack design that fulfills a specification that includes mitigation or prevention of signal inversion. Parameters to take account of include: touch panel thickness, distances between touch sensor electrode layers and conductive layers of the display stack.

In particular, in each sub-area, this pattern may be such that at least four higher order X and at least four higher order Y branches extend alongside one another separated by a gap suitable for making a mutual capacitance measurement of a touching object impinging on the touch surface. Higher numbers of co-extending branches are also readily achievable. Namely, in each sub-area, it is possible to provide at least one of 5, 6, 7, 8, 9 and 10 higher order X and at least 5, 6, 7, 8, 9 and 10 higher order Y branches extend alongside one another separated by a gap suitable for making a mutual capacitance measurement of a touching object impinging on the touch surface.

A further aspect of the disclosure relates to a method of manufacturing a device incorporating a capacitive touch sensor, the method comprising:

fabricating a touch panel having on an upper side a touch surface and on a lower side an internal surface, the touch panel being made of a dielectric material and having a thickness, h, of less than or equal to 400 micrometers; and fabricating X and Y touch sensor electrodes arranged under the touch panel so as to cross each other at crossing points to form a two-dimensional array of nodes, the X and Y electrodes of each node comprising mutually co-extending X and Y electrode portions of respective widths, Wx and Wy, that are separated by a gap, G, suitable for making a mutual capacitance measurement of a touching object impinging on the touch surface, wherein the width, Wy, of the co-extending Y electrode portions plus the gap, G, between co-extending X and Y electrode portions is less than or equal to one of: 4, 3 or 2 times the thickness, h, of the touch panel.

The method may further comprise fabricating a display comprising display electrodes to form a single stack with the capacitive touch sensor and thereby form a touch screen.

In some embodiment, at each node the co-extending X and Y electrode portions separated by the gap G are arranged in groups, each group being separated by a distance of at least one of 2, 3, 4 or 5 times the gap G, so that the mutual capacitance between groups is smaller than the mutual capacitance within groups.

By co-extending, interdigitating or interleaving multiple higher order branches of the X and Y electrodes, it is possible to produce a more uniform electrical field distribution across the sub-area associated with each node. The magnitude of perturbances of touches to the electrical field become a monotonal, i.e. single valued, function of surface area of the touch, thereby simplifying the post-processing which is performed to determine touch location and size.

By co-extending, interdigitating or interleaving multiple higher order branches of the X and Y electrodes can also deliver significant benefits for the edges, since the sensitivity and linearity can be maintained right up to the edge of the touch sensitive area, i.e. in the nodes that are at the edge of the node array, allowing bezel free touch screen devices to be realized with substantially linear touch sensitivity right up to the edges.

By co-extending, interdigitating or interleaving multiple higher order branches of the X and Y electrodes, it is possible to make the electrode pattern such that the X and Y nodes are coincident with each other. In particular the X and Y nodes can be arranged to form an array of square nodal areas. This enables the perturbances of a touch to X and Y electric fields to be considered independently in each of the X and Y axes. This further simplifies the post-processing performed by position finding algorithms, thereby improving linearity, accuracy and speed of touch determination. Moreover, for self capacitance measurements, when the touch size is smaller than the node area, there is always positional information in both X and Y axes. Still further, making the X and Y nodes coincident with each other means that the signals associated with mutual capacitance and self capacitance measurements are centered at the same location.

Having a high level of co-extension, interdigitation or interleaving also means that in each node area the electrode pattern has many gaps, i.e. the gaps between the interdigitating higher order electrode branches. This in turn leads to good coupling to ground for floating touches. For a floating touch, the principal ground of a touch screen will be the conductive material associated with the display drive electrodes. Having many gaps in the touch sensor electrode pattern means that if there is a floating touch (e.g. from a user who is not holding the device, so is not grounded to the device chassis or housing), the touch can still ground to the display electrodes.

The number and size of co-extending higher order X and Y branches, and in particular the number of interdigitating or interleaving electrode branches between X and Y, can selected freely as a design parameter to optimise the specification in terms of lateral field uniformity, sensitivity and capacitive loading, taking account of the particular stack configuration. Parameters to take account of when designing the optimum interdigitation include: touch panel thickness, and for touch screened, distance between electrode pattern layers and relevant display layers. The level and type of interdigitation becomes a compromise between uniformity of field across the touch sensor, touch sensitivity, effective electrode impedance (charge time) and capacitive loading. In respect of charge time of an electrode during self capacitance measurements, this will effectively scale with electrode area. For example, this means that if the X and Y electrodes are to have the same charge time (which is desirable) the X and Y electrode areas should be the same. Moreover, to give the sensor faster cycle times (which is sometimes desirable), the electrode areas should smaller Co-extending, interleaving or interdigitating of X and Y higher order branches also allows electrode patterns which provide shielding of the Y electrodes (e.g. sense electrodes in mutual capacitance) by the X electrodes (e.g. drive electrodes in mutual capacitance), thereby to improve noise performance.

BRIEF DESCRIPTION OF THE DRAWINGS

In the following, the present invention will further be described by way of example only with reference to exemplary embodiments illustrated in the figures.

FIG. 20A is a schematic view of the front of a handheld touch screen computing device according to embodiments of the disclosure.

FIG. 20B is a schematic view of the rear of the handheld touch screen computing device of FIG. 20A.

FIG. 21 is a block diagram of the functional components of the computing device of FIG. 20A and FIG. 20B.

DETAILED DESCRIPTION OF THE PREFERRED EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1A:
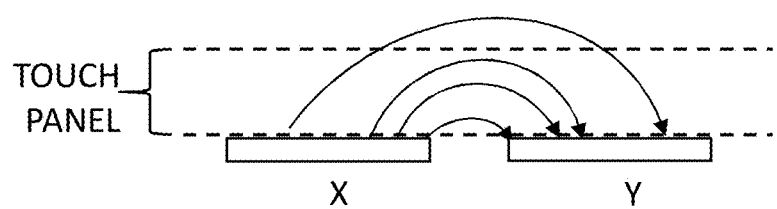
FIG. 1A is a schematic cross-section through a touch panel showing the electric field distribution during a mutual capacitance measurement.
Figure 1B:
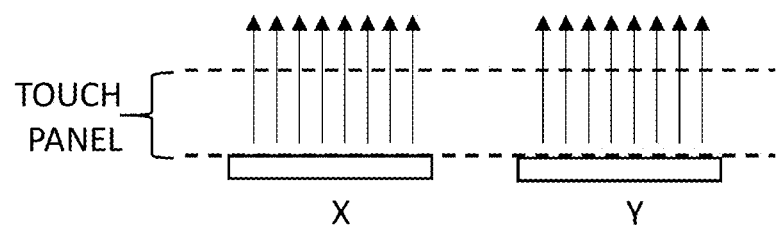
FIG. 1B is a schematic cross-section through the same touch panel as FIG. 1A showing the electric field distribution during a self capacitance measurement.
Figure 2:
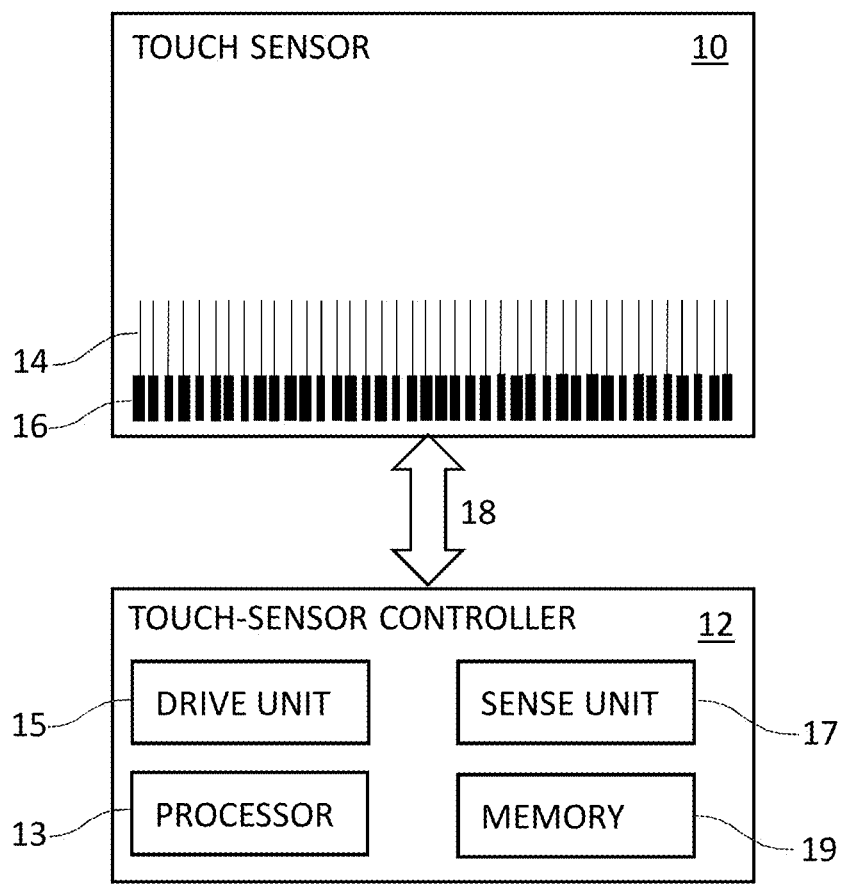
FIG. 2 illustrates an example touch sensor with an example controller.

FIG. 2 illustrates an example touch sensor 10 with an example touch-sensor controller 12, often referred to in the art as a touch integrated circuit (touch IC) or touch sensor/screen controller/chip (TSC). The touch sensor 10 and the touch-sensor controller 12 may detect the presence and location of a touch or the proximity of an object within a touch-sensitive area of the touch sensor 10. The touch sensor 10 may include one or more touch-sensitive areas. The touch sensor 10 may include an array of electrodes which may be arranged in a single layer or multiple layers. The electrode array will usually be of a conductive material, each layer of which is deposited on a dielectric material that forms a substrate, e.g. for support and/or to provide a suitable deposition surface.

Each electrode may be an area of conductive material of a desired topographic form. As an example and not by way of limitation, an electrode may be made of indium tin oxide (ITO), which is chosen for display applications, since it is transparent in the visible region. The proportion of the electrode area covered by conductive material may vary depending on the design, this percentage being sometimes referred to in the art as the fill percentage. As an example and not by way of limitation, an electrode may be made of metal or metallic material or other conductive material such as for example copper, silver, or a copper- or silver-based material or silicide. The necessary fine structure to produce a desired topography in metal is sometimes referred to as fine line metal (FLM). The conductive material may be fine-meshed in addition to its topographic form where the holes in the mesh are sized and arranged to coincide in a direction perpendicular to the plane of the touch sensor with underlying light emitters of a display, such as an OLED display. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fill percentages having any suitable patterns which fulfill a specification.

In embodiments of the disclosure, the touch sensor is fabricated as a laminar structure comprising a number of layers which are deposited or otherwise fabricated in a particular sequence. The layered structure is referred to in the art as a stack. In touch screen embodiments, the stack includes display layers to provide an integrated display and touch sensor, i.e. an integrated touch screen. Alternatively, a touch screen may be fabricated from a sensor stack and a display stack, wherein the two stacks are unified in some suitable way as independent sub-assemblies, e.g. by a suitable bonding. The stack may comprise a substrate (or multiple substrates) and the conductive material forming the electrodes of the touch sensor 10.

The layers of a display stack enable a display screen to produce a colour or monochromatic image. The number, type and juxtaposition of layers depends on the type of display screen. For example, an LCD will have different layers and layer sequences than an OLED display. To form a touch screen, a touch sensor is typically placed over the display stack, either integrated as one stack or as two separate stacks which are arranged together after their respective manufacture.

As an example and not by way of limitation, the stack may include a first layer of optically clear adhesive (OCA) beneath a touch panel of a display stack. The touch panel may be clear and made of a resilient material suitable for repeated touching, such as for example a glass material, or a plastics material. Suitable glasses are from the alkali aluminosilicate family. Suitable plastics materials include polycarbonate (PC) and polymethyl methacrylate (PMMA). This disclosure contemplates any suitable touch panel made of any suitable material. The first layer of OCA may be disposed between a layer or substrate of the display stack and the substrate with the conductive material forming the electrodes. The substrate with the conductive material may provide a benefit or feature in producing an image (e.g., it may be a layer or substrate found in a typical, non-touch, display stack) or it may be a layer added specifically to provide a substrate on which the electrodes are formed. In some embodiments, the stack may also include a second layer of OCA. In some embodiments, the stack may also include a dielectric layer (which may be made of polyethylene terephthalate (PET) or another suitable material, similar to the substrate with the conductive material forming the electrodes). As an alternative, where appropriate, a thin coating of a dielectric material may be applied instead of the second layer of OCA and/or the dielectric layer. The second layer of OCA may be disposed between the substrate with the conductive material making up the electrodes and the dielectric layer, and the dielectric layer may be disposed between the second layer of OCA and another layer of the display stack. As an example only and not by way of limitation, the touch panel may have a thickness of approximately 0.15 to 1 mm; the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm. Although this disclosure describes particular example stacks with particular layers and orders of layers made of particular materials and having particular thicknesses, this disclosure contemplates any suitable stack with any suitable number of any suitable layers made of any suitable materials and having any suitable thicknesses.

In particular embodiments, the electrodes of the touch sensor 10 may be made of ITO in whole or in part. In particular embodiments, the electrodes of the touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

In a self capacitance implementation or mode of use, the touch sensor 10 has an array of electrodes of a single type that each singly forms a capacitive node. When an object touches or comes within proximity of the capacitive node, a change in self capacitance may occur at the capacitive node and the touch-sensor controller 12 may measure the change in capacitance, for example, as a change in the amount of charge needed to raise the voltage at the capacitive node by a pre-determined amount. As with a mutual capacitance implementation, by measuring changes in capacitance throughout the array, the touch-sensor controller 12 may determine the position of the touch or proximity within the touch-sensitive area(s) of the touch sensor 10.

In a mutual capacitance implementation or mode of use, the touch sensor 10 has an array of electrodes of at least two different types for drive and sense respectively, which cross each other (in plan view) to form an array of capacitive nodes. A given pair of drive and sense electrodes forming a capacitive node cross each other without making electrical contact, but with capacitive coupling across a solid dielectric situated between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of the touch sensor 10. In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines, although other angles of crossing are possible. Herein, reference to a drive line may encompass one or more drive electrodes making up the drive line. Similarly, reference to a sense line may encompass one or more sense electrodes making up the sense line.

It will be further understood that a particular touch sensor 10 may be operable in both self capacitance and mutual capacitance modes using the same electrodes, wherein the touch-sensor controller 12 is configured to switch between these modes as desired.

To enable mutual capacitance measurements to be made, the touch sensor 10 has two types of electrodes (e.g. X and Y) formed in a grid pattern on either side of a dielectric or on one side of a dielectric. A pair of electrodes, one from each type, capacitively coupled to each other across a space between them may form a capacitive node. For a self capacitance implementation, both types of electrode are generally used (although in principle a self capacitance measurement could be made with only a single type). For example, to carry out a self capacitance measurement, all the X and Y electrodes can be driven to a certain potential and then discharged through an analog integrator. Each pin has a tristate output architecture and an analog integrator (or a connection to allow each pin to be multiplexed to an analog integrator), with the states being: drive, float, switch to integrator, measure and discharge. The same touch sensor is therefore able to operate in both mutual capacitance and self capacitance modes.

Where the electrodes of the two different types cross (as viewed in plan view) and hence come nearest to each other a capacitive node is formed. Where they cross, the electrodes do not make electrical contact with each other, but are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of the touch sensor 10 may indicate a touch or proximity input at the position of the capacitive node. The touch-sensor controller 12 may detect and process the change in capacitance to determine the presence and location of the touch or proximity input. The touch-sensor controller 12 may then communicate information about the touch or proximity input to one or more other components (such one or more central processing units (CPUs)) of a device that includes the touch sensor 10 and the touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

In particular embodiments, the touch-sensor controller 12 comprises analogue circuitry, digital logic, and digital volatile or non-volatile memory. The touch-sensor controller 12 may include one or more integrated circuits (ICs), such as for example general-purpose microprocessors, microcontrollers, programmable logic devices or programmable logic arrays (PLAs), or application-specific ICs (ASICs). The memory of the touch-sensor controller 12 may be a random access memory (RAM), a read-only memory (ROM), an erasable programmable read-only memory (EPROM or Flash memory), a static random access memory (SRAM), and any suitable combination of the foregoing. The touch-sensor controller 12 may be programmed with computer readable program instructions which can be downloaded from a computer readable storage medium or an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The touch-sensor controller 12 comprises electronic circuitry and may be programmed, for example, with programmable logic circuitry, field-programmable gate arrays (FPGA), or programmable logic arrays (PLA) which may execute the computer readable program instructions by utilizing state information of the computer readable program instructions to personalize the electronic circuitry, in order to perform aspects of the present disclosure.

In particular embodiments, the touch-sensor controller 12 is disposed on a flexible printed circuit (FPC) bonded to the substrate of the touch sensor 10. The FPC may be active or passive, where appropriate. In particular embodiments, multiple touch-sensor controllers 12 are disposed on the FPC. The touch-sensor controller 12 may include a processor 13, a drive unit 15, a sense unit 17, and a memory 19. The drive unit 15 may supply drive signals to the drive electrodes of the touch sensor 10 for making mutual capacitance measurements. The sense unit 17 may sense charge at the capacitive nodes of the touch sensor 10, in both mutual and self capacitance measurements, and provide measurement signals to the processor 13 representing capacitances at the capacitive nodes. The processor 13 may control the supply of drive signals to the drive electrodes by the drive unit 15 and process measurement signals from the sense unit 17 to detect and process the presence and location of a touch or proximity input within the touch-sensitive area(s) of the touch sensor 10. The processor 13 may also follow changes in the position of a touch or proximity input within the touch-sensitive area(s) of the touch sensor 10. The memory 19 may store programming for execution by the processor 13, including programming for controlling the drive unit 15 to supply drive signals to the drive electrodes, programming for processing measurement signals from the sense unit 17, and other suitable programming, where appropriate. Although this disclosure describes a particular touch-sensor controller having a particular implementation with particular components, this disclosure contemplates any suitable touch-sensor controller having any suitable implementation with any suitable components.

On a substrate of the touch sensor 10, a plurality of tracks 14 of conductive material are disposed to couple each of the X and Y electrodes of the touch sensor 10 to connection pads 16, which are disposed on a substrate of the touch sensor 10. The connection pads 16 facilitate coupling of the tracks 14 (and hence X and Y electrode lines) to the touch-sensor controller 12. The tracks 14 may extend into or around (e.g. at the edges of) the touch-sensitive area(s) of the touch sensor 10. A particular subset of the tracks 14 may provide drive connections for coupling touch-sensor controller 12 to drive electrodes of the touch sensor 10, through which the drive unit 15 of touch-sensor controller 12 may supply drive signals to the drive electrodes. Other tracks 14 may provide sense connections for coupling touch-sensor controller 12 to sense electrodes of the touch sensor 10, through which the sense unit 17 of touch-sensor controller 12 may sense charge at the capacitive nodes of the touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of the touch sensor 10 (similar to tracks 14).

The connection pads 16 may be located along one or more edges of the touch sensor 10, outside the touch-sensitive area(s). As described above, the touch-sensor controller 12 may be on an FPC. The connection pads 16 may be made of the same material as the tracks 14 and may be bonded to the FPC using an anisotropic conductive film (ACF). The connection 18 may include conductive lines on the FPC coupling the touch-sensor controller 12 to the connection pads 16, in turn coupling the touch-sensor controller 12 to the tracks 14 and to the electrodes of the touch sensor 10. This disclosure contemplates any suitable form or type of connection 18 between the touch-sensor controller 12 and the touch sensor 10.

Figure 3A:
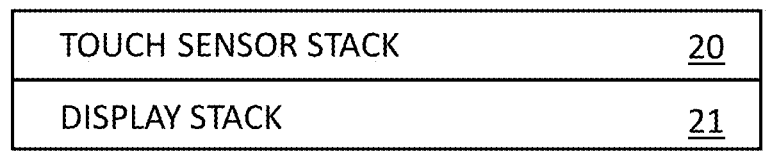
FIG. 3A illustrates a block diagram of an on-stack touch screen where the layers associated with the sensor function are physically separate from and functionally independent of the layers associated with the display function.

FIG. 3A illustrates a block diagram of an on-stack touch screen in accordance with particular embodiments comprising a touch sensor stack 20 arranged on a display stack 21. In an on-stack design, the layers associated with the sensor function are physically separate from and largely electrically functionally independent of the layers associated with the display function (although there will inevitably be some capacitive coupling of the touch sensor to conductive parts of the display stack, principally the TFT drive electrodes).

Figure 3B:
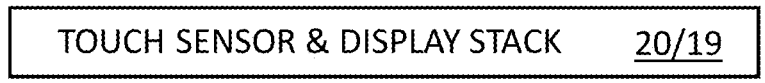
FIG. 3B illustrates a block diagram of an in-cell touch screen where the layers associated with the sensor function and display function are interleaved and/or shared.

FIG. 3B illustrates a block diagram of an in-cell touch screen in accordance with particular embodiments comprising a combined touch sensor and display stack 20, 21. In an in-cell design, the layers associated with the sensor function and display function are interleaved and/or shared.

The display stack 21 may comprise a plurality of layers configured to generate a colour image. The type and number of layers within the display stack 21 may vary depending on the type of display stack and/or the intended application of the display stack 21. For example, an LCD display stack 21 will typically require at least two polarisers above and below the liquid crystal layer, whereas an OLED display stack 21 does not require a polariser, but may include one or two. Each layer may comprise a particular feature or characteristic used in a display stack 21 for generating an image. These layers may in some embodiments, be configured to provide a colour image. Particular embodiments contemplate the display stack 21 comprising any number and/or type of layers for any type of display. In some embodiments, the display stack 21 may be a flexible display stack. In some embodiments, the display stack 21 may be curved over one or more parts of its surface (e.g. Samsung Galaxy Edge (trade mark) mobile telephone) or over its whole surface (e.g. large screen television). In still further embodiments, the display stack 21 may be flexible so that it can be flat or adopt a variety of complex curves depending on its environment. It is noted that for non-flat stacks, references to x and y or X and Y should be interpreted to lie in the plane of the stack layers, even if the plane is curved or otherwise non-planar in real space.

One or more components of the touch sensor 10 may be integrated into the display stack 21 in any of a variety of different ways, depending on operational needs or the particular embodiment. The touch sensor 10 may be located in any of a variety of different locations within the display stack 21. The location of the touch sensor 10 may vary depending on the type of the display stack 21 (e.g., an LCD display, OLED display, e-ink display etc.). For example, in an LCD display in which display stack 21 includes at least two polarisers, the touch sensor 10 may be positioned within the display stack 21 so as to not alter the polarisation of the light. For example, in an LCD display stack 21, if the touch sensor 10 includes a substrate made of a birefringent material, then the touch sensor 10 is not arranged between the LCD's two polarisers, but rather above them. If the touch sensor 10 includes a substrate made of a non-birefringent material, the touch sensor 10 may be positioned between the polarisers of the display stack 21. On the other hand, in an OLED display stack 21, it may not matter whether or not the touch sensor 10 includes a layer of birefringent material, so there is more design freedom to arrange the touch sensor layers where desired, e.g. some of the touch sensor layers interleaved with (or combined with) layers of the display stack 21. For example, in some embodiments the touch sensor 10 may use an existing layer (e.g., a layer found in a typical non-touch display stack, such as the colour filter layer or one of the polariser layers, etc.) of the display stack 21 as a substrate.

The touch sensor 10 may be similar to, and comprise similar components and functionality as, the touch sensor 10 described above with respect to FIG. 2. Depending on the embodiment, and/or operational needs, the touch sensor 10 may be a laminated layer within the display stack 21, or one or more of the components of the touch sensor 10 (e.g., fine line metal electrodes for sensing a touch input) may be deposited on an existing layer of the display stack 21. This may allow the touch sensing functionality to be included during the manufacturing of the display stack 21. In embodiments in which the touch sensor 10 is deposited on an existing layer of the display stack 21, the existing layer of the display stack 21 may function as the substrate for the touch sensor 10. In other embodiments, the touch sensor 10 may comprise its own substrate that is placed within the display stack 21. Depending on the type of display and/or the desired location of the touch sensor 10 within display stack, the substrate used for the touch sensor 10 may be made of a birefringent material or a non-birefringent material. In certain embodiments, having the touch sensor 10 within the display stack 21 allows for a display stack with touch sensing capability that is substantially free of any air gaps between the touch sensor 10 and display stack 21. As such, in certain embodiments, having the touch sensor 10 within the display stack 21 allows for a display stack with touch sensing capability that is thinner than a traditional display stack with a touch sensor added on top of the display stack.

Figure 4:
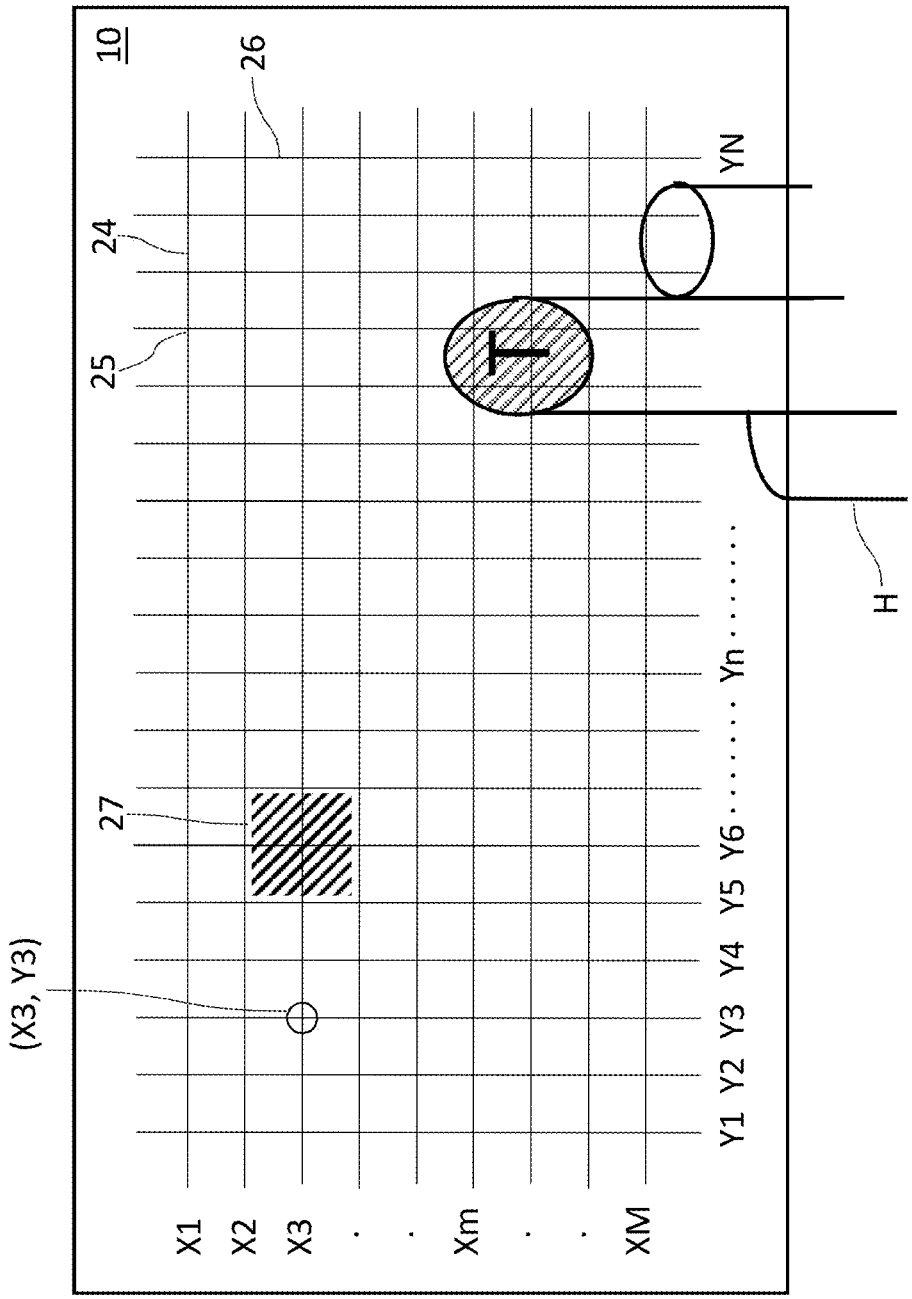
FIG. 4 is a schematic drawing in plan view of an example touch sensor according to embodiments of the disclosure.

FIG. 4 is a schematic plan view of an example touch sensor 10 according to embodiments of the disclosure which is of the grid type. There are two groups of parallel electrodes, X electrodes 24 and Y electrodes 26. The X and Y electrodes are illustrated as extending orthogonal to each other, but other angles could be used, so long as the X and Y electrodes cross to form a suitable number and overall density of nodes 25, where nodes are defined by the crossing points of pairs of X and Y electrodes (as viewed in plan view). An example node (X3, Y3) is marked in the figure. The number of nodes 25 will generally be the product of the number of X electrodes and Y electrodes—in the illustrated example there are M x N nodes, where M is the number of X electrode lines and N is the number of Y electrode lines. Each node, i.e. crossing point, 25 is associated with a sub-area 27 of the touch sensor into which X and Y electrode patterning can extend so that touches will generate signals that will be associated with that node. (No electrode patterning is shown in FIG. 4; only the so-called spines of the X and Y electrodes.) For example, in the figure, node (X3, Y6) has a possible associated sub-area 27 marked with bold hatching. Assuming that there are no crossings between X and Y electrodes except at the principal crossing-points 25 (which is the usual case), then the extent of the sub-area for an arbitrary crossing point between electrodes $X_n$ and $Y_n$ is defined by the area formed between electrodes $X_{n-1}$ and $X_{n+1}$ and $Y_{n-1}$ and $Y_{n+1}$, i.e. a block of four squares in FIG. 4. In some electrode patterns, touches anywhere within the sub-area will generate signals that will be associated with that node. However, with other electrode patterns, only a portion of the sub-area will be associated with the node. The X and Y electrodes are arranged either side of a dielectric layer (not visible in the figure), so they are vertically offset from each other by the thickness of the dielectric layer, vertical meaning orthogonal to the plane of the stack layers, i.e. in the figure perpendicular to the plane of the paper. If desired, it is possible to deposit the X and Y electrodes on the same side of a dielectric, substrate layer with thin films of insulating, dielectric material being locally deposited at the cross-overs to avoid shorting between the X and Y electrodes. A single electrode layer design of this kind is disclosed in US 2010/156810 A1, the entire contents of which are incorporated herein by reference. In the figure, a schematic touch T by a finger from a user's hand H is shown. From the illustration, it is clear that a single touch can often extend over several nodes—in the illustration the touch covers four nodes extending over two adjacent X lines and two adjacent Y lines. Having signals from at least two adjacent X electrodes and at least two adjacent Y electrodes respectively enables interpolation of the touch signals to be performed in both x and y directions in order to deduce the x, y touch coordinates. It will be understood that a crossing point is not actually a point in a geometric sense, but rather an area, since at the crossing point where an X and Y electrode cross there will be a finite area, as considered in plan view, over which the X electrode and the Y electrode overlap. In the case of orthogonal crossing of straight X and Y electrode portions of respective widths Wxc and Wyc, the overlap area will be the product of Wxc and Wyc.

Figure 5:
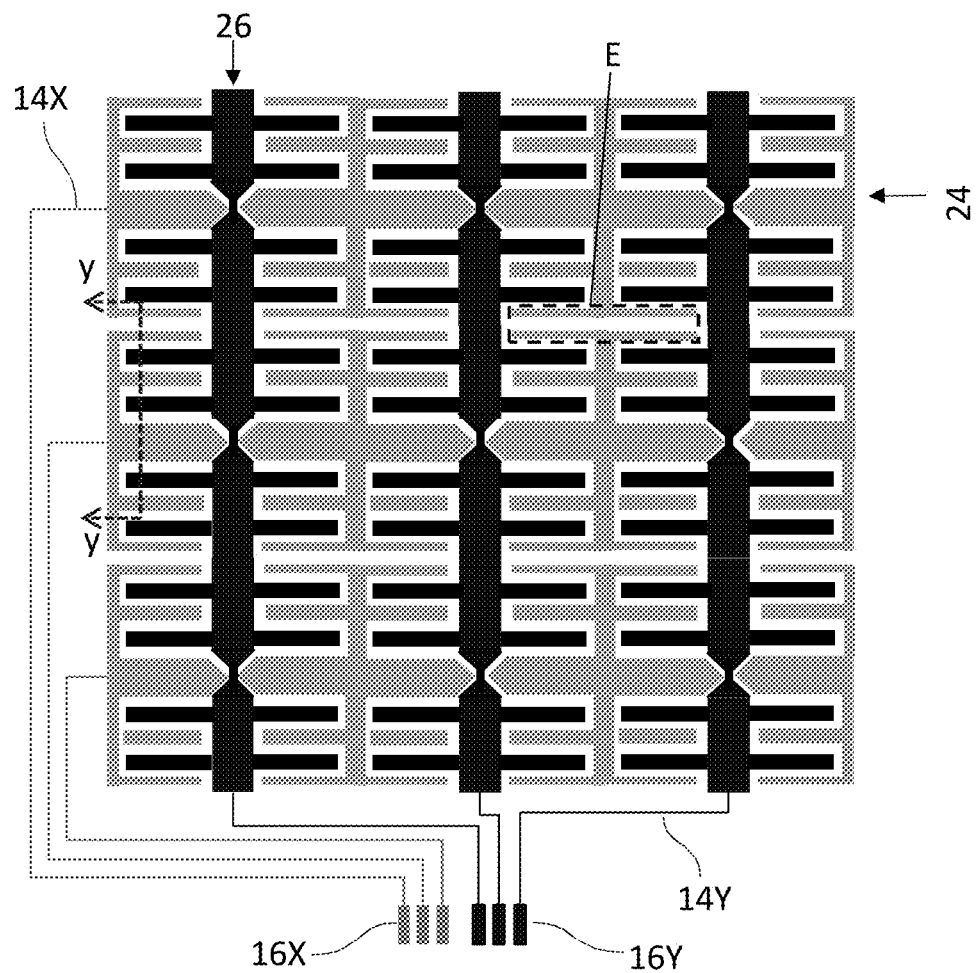
FIG. 5 is a schematic drawing in plan view of an electrode pattern and associated connections according to one embodiment.

FIG. 5 is a schematic plan view drawing of an embodiment and shows an electrode pattern comprising a nominal 3×3 array of nodes with associated tracks and connection pads. It will be appreciated that a commercial device will normally have a larger node array, but a 3×3 array is sufficient to show all aspects of the pattern, in particular at the x and y edges and corners as well as in the interior away from the edges.

Figure 6:
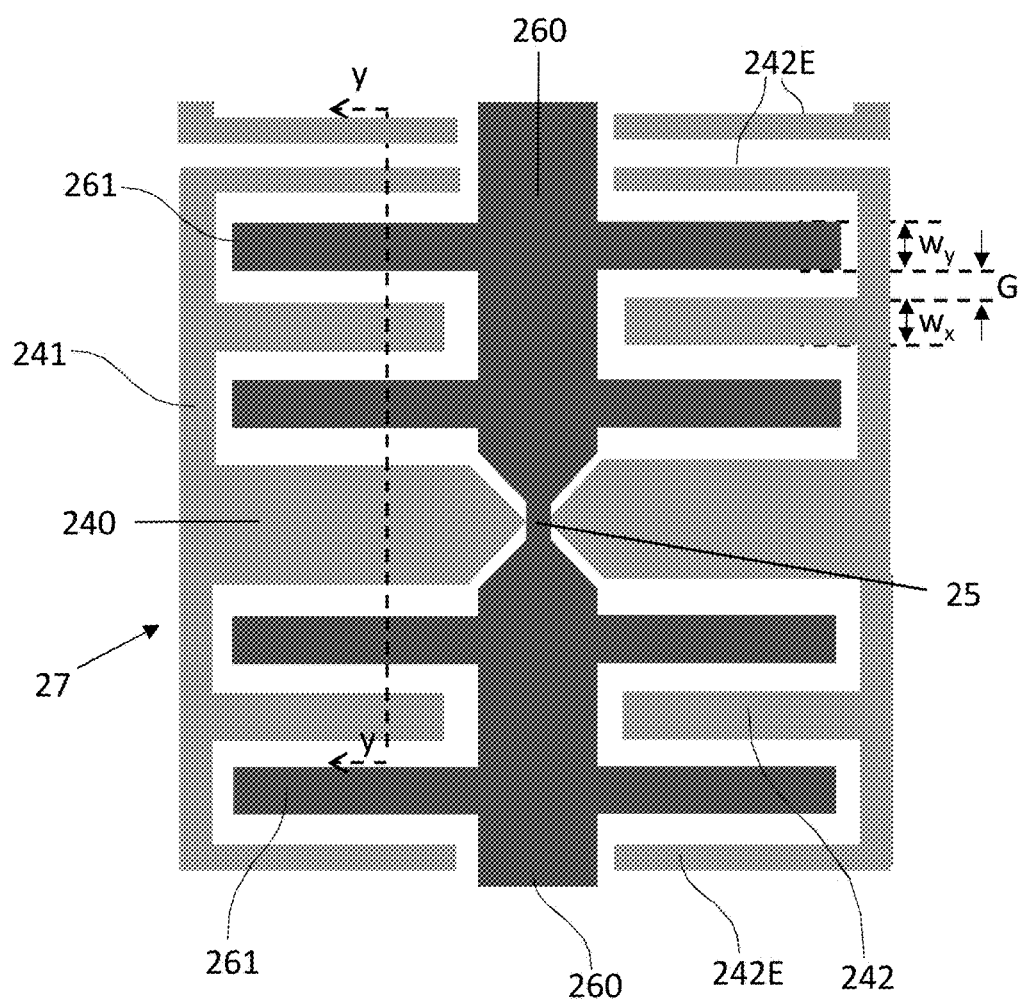
FIG. 6 shows a limited region of the electrode pattern of FIG. 5 in more detail.

FIG. 6 shows a zoomed in portion of FIG. 5 in the immediate vicinity of one of the nodes. We now describe FIG. 5 and FIG. 6 together.

For mutual capacitance measurements, we take the X electrodes as being connected to be operable as drive electrodes and the Y electrodes as being connected to be operable as sense electrodes. (However, the opposite arrangement is also possible, i.e. X is sense and Y is drive.) The X electrodes may be arranged below the Y electrodes, so that the Y electrodes are closer to the touch panel than the X electrodes. (However, the opposite ordering is also possible.)

The electrode pattern forms one or more layers of a capacitive touch sensor as described elsewhere in this document. The electrode pattern underlies a touch panel having on an upper side a touch surface and on a lower side an internal surface. The touch panel is made of a dielectric material. The electrode pattern may be embedded in a dielectric material, such as a suitable adhesive and/or be disposed on one side of a non-conductive substrate.

Elements of the basic structure are as described above in relation to FIG. 2 and FIG. 4. Referring to FIG. 5, three rows of X electrodes 24 are connected to respective X-electrode tracks 14X which lead to connection pads 16X to ohmically couple each row of X electrodes to a touch-sensor controller. Similarly, three columns of Y electrodes 26 are connected to respective Y-electrode tracks 14Y which lead to connection pads 16Y to ohmically couple each column of Y electrodes to a touch-sensor controller. The X electrodes are shown with lighter grey shading and the Y electrodes darker in the figure.

Each electrode has a branch structure with a central spine or trunk which is the part of the electrode that forms the nodes, and branches off the spine, which in turn may have branches from them also. We therefore refer to a spine as a zeroth order branch, a branch from the spine as a first order branch, a branch from the first order branch as a second order branch and so forth. The second, third, fourth etc. order branches are collectively referred to as higher order branches in contradistinction from the zeroth order branches.

The electrode pattern therefore comprises a set of X electrodes 24 each having a zeroth order branch (i.e. X-spine) extending in an x-direction and a set of Y electrodes 26 each having a zeroth order branch (i.e. Y-spine) extending in a y-direction transverse to the x-direction. Typically, the x- and y-directions will be at right angles to each other, although this is not technically necessary. The zeroth order branches of the X and Y electrodes cross each other at crossing points 25 to form a two-dimensional array of nodes. The zeroth order branches of any two adjacent X electrodes and any two adjacent Y electrodes enclose a sub-area, which is square or rectangular in the case of x being orthogonal to y. It will be appreciated that in commercial devices, the sub-areas are most commonly square to provide the same touch resolution in the x and y directions.

The X and Y electrodes 24 and 26 each further comprise higher order branches of order n, each of which is confined to the sub-area into which it buds or branches. The value 'n' is a positive integer (i.e. 1, 2, 3 . . . ). An nth order branch buds from an (n−1)th order branch. Away from edges of the node array, each node is thus associated with four sub-areas.

Each X electrode 24 has first order branches 241, branching from its zeroth order branch 240, and second order branches 242 branching from its first order branches 241. The zeroth order branch 240 extends in the x direction. The first order branches 241 extend in the y direction. The second order branches 242 extend in the x direction. Each Y electrode 26 has first order branches 261, branching from its zeroth order branch 260. The zeroth order branch 260 extends in the y direction. The first order branches 261 extend in the x direction.

The zeroth order X and Y branches 240, 260 are narrowed at the crossing points 25 to reduce the area of crossing represented by the product of the respective thicknesses of the X and Y zeroth order branches at the crossing point 25. In the plan view illustration, the Y branch 260 is shown passing over the X branch 240 in the manner of a bridge and river respectively. (Alternatively, the zeroth order X branch could pass over the zeroth order Y branch.)

In each sub-area, certain ones of the higher order X and Y branches extend alongside one another separated by a gap 'G' suitable for making a mutual capacitance measurement of a touching object impinging on the touch surface. In example implementations, the gap 'G' between those co-extending drive and sense electrodes or electrode portions that contribute principally to mutual capacitance is in the range 50 to 300 micrometers, in particular 100 to 200 micrometers. In the illustrated pattern, the co-extending higher order X and Y branches are first order Y branches 261 and second order X branches 242 which extend in the x direction. The co-extension is in the form of an interdigitation of fingers, the fingers being the above-mentioned higher order branches.

As can be seen from FIG. 6, in each sub-area, the outermost second order X branches 242 (i.e. farthest from either side of the zeroth order branch in the y-direction) enclose the outermost (also in the y-direction) first order Y branches 261. These outermost second order X branches are given the reference numeral 242E. The mutual capacitances between the second order X branches and first order Y branches are thus substantially confined to, i.e. encapsulated in, the portion of the sub-area illustrated in FIG. 6. In the y-direction, the outermost second order X branches 242E that provide the field encapsulation are directly adjacent to those of the neighbouring X electrode, i.e. there is no portion of Y electrode in between them. One of these pattern regions is marked with the dotted box labelled 'E' in FIG. 5.

In particular, it can be seen that there is one more interdigitating X branch than Y branch (5 vs 4 in the illustration) so that all the interdigitating Y branches are enclosed by interdigitating X branches.

The exact number of co-extending higher order branches per sub-area can be varied as desired. For example, there may be 4, 5, 6, 7, 8, 9, 10 or more higher order X and 4, 5, 6, 7, 8, 9, 10 or more higher order Y branches that extend alongside one another. The degree of interdigitation can thus be freely chosen as part of the design.

Figure 7:
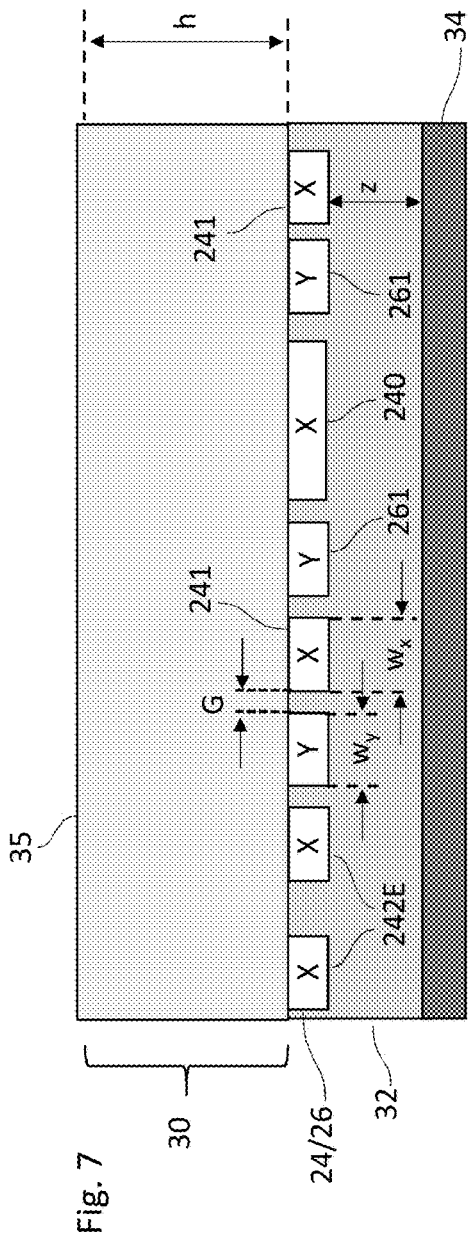
FIG. 7 is a schematic cross-section through the plane yy of FIG. 6.

FIG. 7 is a schematic cross-section through the plane yy shown in FIG. 5 and FIG. 6. The uppermost electrode portion 242E of FIG. 6 is the leftmost electrode portion 242E in FIG. 7. A touch panel 30 of thickness 'h' has an upper side facing a touch surface 35 and a lower side which is an internal surface bonding to the layers below. The touch panel 30 is made of a dielectric material. A touch sensor electrode layer accommodating interdigitating X and Y electrode portions 240+, 260+ of X and Y electrodes 24 and 26 is arranged under the touch panel 30. Adjacent interdigitating portions of the X & Y electrodes have widths Wx and Wy respectively, where these electrode portions co-extend (out of the plane of the drawing) separated by a gap 'G' suitable for making a mutual capacitance measurement of a touching object impinging on the touch surface 35. It will be appreciated that any given X electrode portion may couple to more than one adjacent interdigitated Y electrode portions, e.g. two as schematically illustrated. The X & Y electrodes 24 and 26 are embedded in a dielectric layer 32, which is on top of the display 34. The display is shown schematically as a monolithic layer, but as described with specific stack examples further below, will be made of multiple layers. For the purposes of explaining the principles involved, it is sufficient to consider the display as a single, conductive layer, where the conductivity principally arises from metallic or other conductive layers in the display, such as the display's electrodes. The vertical separation of the touch sensor electrodes 24, 26 and the display electrodes 34 through the dielectric layer 32 is 'z'. Typical dimensional ranges for 'h' and 'z' are in the range 100 to 500 micrometers.

As touch screens become thinner, the display, and in particular its electrodes, come closer to the touch sensor electrodes. There is then a significant self capacitance between the touch sensor electrodes and the display electrodes, which can be of the same order of magnitude as the self capacitance between the touch sensor electrodes and a touch. The display electrodes can be thought of as pre-loading the capacitance of the touch sensor electrodes. Specifically, there is a capacitance CpXD from the drive electrode to the display, and a capacitance CpYD from the sense electrode to the display.

Not only does the display proximity have an effect on self capacitance measurements, but also mutual capacitance measurements when the touch is poorly grounded, i.e. a so-called floating touch, through the self capacitance between a poorly grounded touch and the display electrodes which manifests itself as a change in capacitance simultaneously with the change in mutual capacitance between the drive and sense touch sensor electrodes.

Figure 8A:
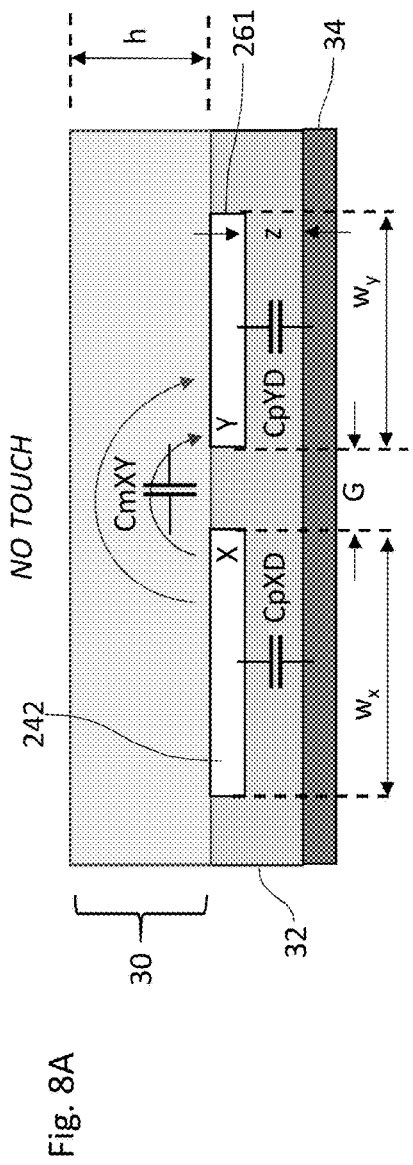
FIG. 8A shows the same structure as FIG. 7, but only illustrates a single X and Y electrode portion.

FIG. 8A shows the same structure as FIG. 7, but only illustrates a single X and Y electrode portion 242 and 261. In addition to the features of FIG. 7, the relevant capacitance components for a mutual capacitance measurement when there is no touch are illustrated, namely the self capacitances from the X and Y electrodes to the display, CpXD and CpYD respectively, and the mutual capacitance between drive and sense electrodes CmXY. When there is no touch, a capacitance measurement determines a capacitance that arises from the mutual capacitance CmXY between paired drive and sense electrodes, which are separated by a gap G, wherein the capacitance measurement also includes contributions from the self capacitances of the drive and sense electrodes to the display, CpXD and CpYD respectively. The proximity of the display thus has the effect of pre-loading the capacitances.

Figure 8B:
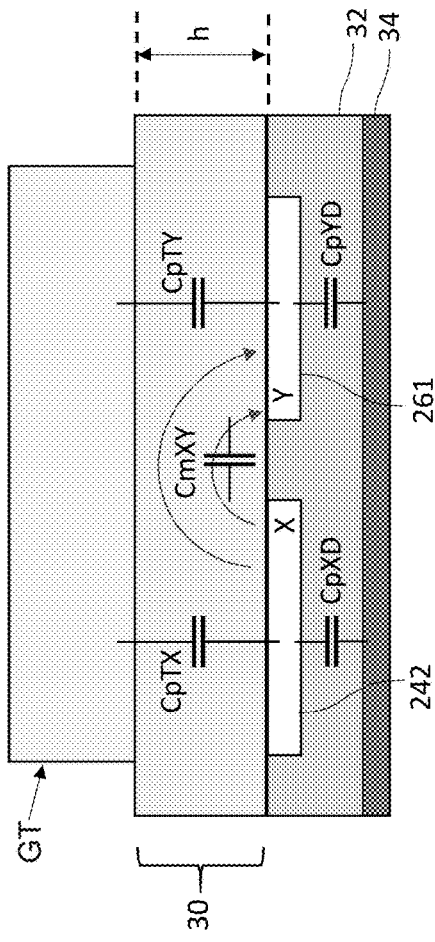
FIG. 8B shows the same structure as FIG. 8A, but with a grounded touch touching the touch surface.

FIG. 8B shows the same structure as FIG. 8A, but with a grounded touch GT touching the touch surface 35 of the touch panel 30. The effect of the grounded touch is to reduce the mutual capacitance between the drive and sense electrodes, CmXY, as a result of the self capacitance from X electrode to touch, CpTX, and Y electrode to touch, CpTY. Specifically, when the touch is well grounded, there is effectively zero self capacitance between the touch and the display electrodes (CpTD=0), since the touch is a conductor that is tied to the display through ground, e.g. the user holding a handheld touch screen device. Moreover, there is no mutual capacitance between the touch and either drive or sense electrode (CmTX=CmTY=0). Therefore there can be no re-radiation, since the electric field is constrained between the touch and the display. For any given design, mutual capacitance between drive and sense electrodes, CmXY, is a function of various parameters, namely: the gap between the drive and sense electrodes, G; touch panel thickness which is the distance from touch to touch sensor electrodes, h; and touch sensor electrode to display distance, z.

Mutual capacitance between drive and sense electrodes CmXY reduces with increasing self capacitance of the drive and sense electrodes, which scales with electrode area. Moreover, it also reduces with reducing distance to the display electrodes through, increasing CpXD and CpYD. The electric field intensity directly in the vicinity of the gap, G, between adjacent drive and sense electrodes remains substantially the same, even with increasing width of the X and/or Y electrodes, Wx, Wy. The electric field intensity reduces along the sense electrode as one moves away from the gap, so the mutual capacitance coupling between a touch and the sense electrode also reduces. This means that, when considering mutual capacitance measurements, there is a sense electrode width above which there is no significant increase in mutual capacitance signal. (Increasing the sense electrode width further would however of course continue to increase self capacitance of that electrode.)

Figure 8C:
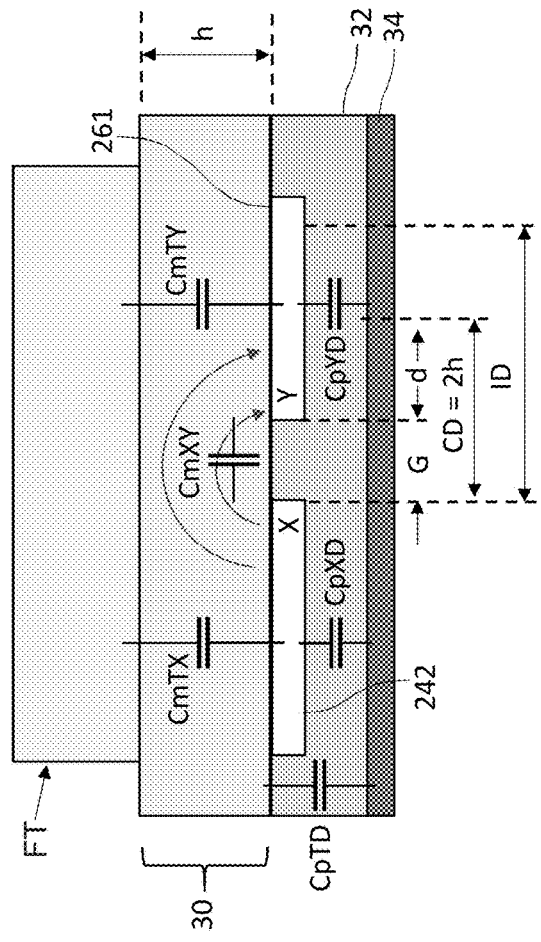
FIG. 8C shows the same structure as FIG. 8A, but with a floating touch touching the touch surface.

FIG. 8C shows the same structure again, but with a floating touch FT touching the touch surface 35 of the touch panel 30. A feature of a floating touch in a touch screen with display electrodes relatively close to the surface under the touch sensor electrodes is that a self capacitance, CpTD, arises between the touch and the display electrodes. The magnitude of this self capacitance, CpTD, is a function of the parallel plate area, which scales with the sum of the areas that lie under and around the touch which are not obscured by the touch sensor electrodes. That is, the capacitance, CpTD, will scale with the size of the gaps between the touch sensor electrodes. This capacitance of course also depends on the touch sensor electrode to display distance, z and the dielectric constant of the dielectric material that lies between the touch surface and the display electrodes. As a result of the self capacitance, CpTD, being non zero, some of the radiated charge from the drive electrode is redistributed through a floating touch to the display, so that the charge from the drive electrode is re-radiated by the floating touch in part towards the display (CpTD) and in part to the sense electrode (CmTY). In contrast to the situation for a grounded touch, the re-radiated charge is thus not confined in the touch panel, but rather the re-radiated field is highly distributed.

Of the two components, CpTD and CmTY, of re-radiated charge, CpTD contributes solely to a reduction in measured mutual capacitance and CmTY contributes solely to an increase. Therefore, so-called delta inversion occurs when the CmTY component becomes so large that a floating touch causes an increase in measured mutual capacitance rather than a decrease compared with the no touch measurement value. If one considers this phenomenon in terms of repeated touches of incrementally increasing size so that the touch extends more and more into the sense electrode, then the CmTY component will get bigger and bigger, whereas the CpTD component will remain the same. Delta inversion can therefore be expected at some value of lateral extent of coverage across the width of the sense electrode from the drive-sense electrode gap. We define an inversion distance (ID) as the distance at which the onset of signal inversion starts, i.e. the distance at which a floating touch produces a mutual capacitance measurement value which is the same as the "No Touch" value. We also define a critical distance as the shortest effective electrical path for re-radiated charge from the drive to sense electrode. Since the touch is itself conductive, the touch does not contribute to the electrical path, which is therefore simply determined by twice the touch panel thickness, i.e. the shortest distance from drive electrode to touch, and from touch to sense electrode. The critical distance is thus twice the touch panel thickness, CD=2 h. In specifying the width of the sense electrode, it is equal to twice the touch panel thickness less the drive-sense electrode gap, i.e. Wy=2 h−G.

An important deduction to make from this analysis is that, if the sense electrode width is designed to have less than the width, 2 h−G, i.e. Wy<2 h−G, then the net effect of the fact that the touch is floating is zero, so a floating touch of any size should cause a reduction in measured mutual capacitance compared with the no touch value and signal inversion should not occur.

Returning to the inversion distance, as stated above this is where a floating touch causes a mutual capacitance measurement which is the same as the "No Touch" value. This will occur when CmTY=CpTD for the floating touch. The inversion distance (ID) therefore a distance greater than the critical distance where the re-radiated charge coupling to the sense electrode from a floating touch has the same magnitude as the re-radiated charge from a floating touch to the display, so that the measured mutual capacitance is unchanged by the floating touch compared with no touch. Inversion distance is a function of drive-sense electrode gap, G, touch panel thickness, h, and electrode to display distance, z. Through simulations and experimentation we find the inversion distance is normally between one-and-a-half and two times the critical distance, i.e. 3 to 4 times the touch panel thickness.

A further important deduction to make from this analysis, at least when considering a small touch confined to a single node, is that, by limiting the width of the sense electrode to the inversion distance minus the drive-sense electrode gap, delta inversion can be avoided, i.e. a floating touch will always have the effect of reducing the measured mutual capacitance compared with the no touch value.

Once a maximum width for the compound dimension of sense electrode width plus drive-sense electrode gap, G+Wy, has been decided upon, namely one that is less than or equal to the inversion distance, other design parameters can be varied to achieve a required sensitivity of grounded and floating touches, such as electrode length, drive-sense electrode gap, G, touch panel thickness, h, distance from electrode to display, z, and the split between drive-sense electrode gap, G, and sense electrode width, Wy.

Following the above teachings, it is therefore desirable to design the electrode pattern such that in the co-extending X and Y electrode portions, the width Wy of the Y (i.e. sense) electrode portions plus the gap G should be less than inversion distance, which can most conveniently be expressed in terms of multiples of the touch panel thickness h. Not only is there an analytical link between inversion distance and touch panel thickness, but also touch panel thickness is an easily understood and measurable parameter. In this context, it will be understood that touch panel thickness 'h' means the thickness of the dielectric between the touch surface 35 and the upper one of the X and Y electrode layers (assuming these are not co-planar). The parameter 'h' may therefore in some stack designs include not only the glass or plastic layer that is most commonly referred to as the touch panel, but also perhaps a dielectric polariser layer, as well as other possible dielectric layers such as an anti-scratch top coat, or a decorative layer under the glass or plastics layer. As mentioned above, based on our investigations, we set the upper limit for the sum of drive-sense electrode gap, G, and sense electrode width, Wy, as 2, 3 or 4 times the touch panel thickness, h.

In terms of a lower limit, in principle, the gap, G, and sense electrode width, Wy, could be vanishingly small, i.e. there is no theoretical limit to reducing these dimensions, in part because the types of electrode patterns proposed allow the number of co-extending higher order branches per sub-area to be varied as desired as part of the design. However, in practice of course, the electrode widths and gaps should be kept to easily manufacturable values. Also, if the sensor is specified to perform self capacitance measurements as well as mutual capacitance measurements, then the amount of electrode area should be kept sufficiently high. A sensible lower bound for the width of each of the drive-sense electrode gap, G, and the sense electrode width, Wy, using conventional fabrication techniques is probably around 50, 60, 70, 80, 90 or 100 micrometers.

Now considering the drive electrode dimensions, such as its width, Wx, and area, these have other effects on performance. One influence of the dimensions of the drive electrode is that a smaller area drive electrode will tend to increase the coupling of a floating touch to the display, i.e. increase CpTD. Another influence is that a larger area drive electrode will increase the coupling between the drive electrode and a touch, i.e. CpTX or CmTX for grounded and floating touches respectively. In practice, it may be convenient to set the drive electrode width, Wx, of the co-extending X electrode portions to be equal to or some low multiple of the sense electrode widths, Wy, for example: Wx/Wy may be 1, 1.5, 2, 3 or 4. In other examples, Wx/Wy may be less than one, for example 0.5, 0.6 or 0.8.

The relative size of G and Wy, e.g. expressed as their ratio or a ratio to their sum, is also a significant parameter. If the gap is increased to increase the inversion distance, this is generally not desirable beyond a certain size of gap, since then the mutual capacitance between co-extending drive and sense electrodes becomes too small. It is therefore better to reduce the sense electrode width Wy. For example, if G+Wy is specified to be 500 micrometers, then Wy=450 µm and G=50 µm is likely to be preferable to Wy=200 µm and G=300 µm.

An additional design parameter which can be introduced in a variation of the proposed design is to split the co-extending X & Y electrode portions into groups, and have an extended distance, bigger than the gap G discussed up to now, between the groups, the extended distance being large enough that there is no significant mutual capacitance between neighbouring groups. With this additional feature, the advantage of mitigating against signal inversion is retained and, moreover, the extended spacing between groups improves the path to ground for a touch on the touch surface through to the display (i.e. increases CpTD). The gaps between groups may be substantially free of conductive material or, alternatively, may include infill of conductive material. Infill would comprise areas of conductive material, preferably the same conductive material as is used to make the electrodes, that are arranged to fill in at least some of the gaps in the electrode pattern between the X and Y electrodes in such a way that the infill areas remain electrically isolated from the X and Y electrodes, i.e. by maintaining a suitable gap free of conductive material adjacent their perimeters.

A suitable separation may be stated: in absolute terms, e.g. at least 200, 300, 400, or 500 µm; in relative terms as a multiple of the gap G, e.g. at least 2, 3, 4, 5, 6, 7, 8, 9 or 10 times the gap G; and/or in terms of the touch panel thickness h, e.g. at least 0.5, 1, 1.5, 2, 2.5, 3, 3.5, 4, 4.5 or 5 times the panel thickness. For example, with Wx=Wy=200 µm and G=25 µm, the co-extending X and Y electrode portions can be arranged in pairs, and each pair separated by say 300 µm. We now discuss some example designs according to this approach.

Figure 9:
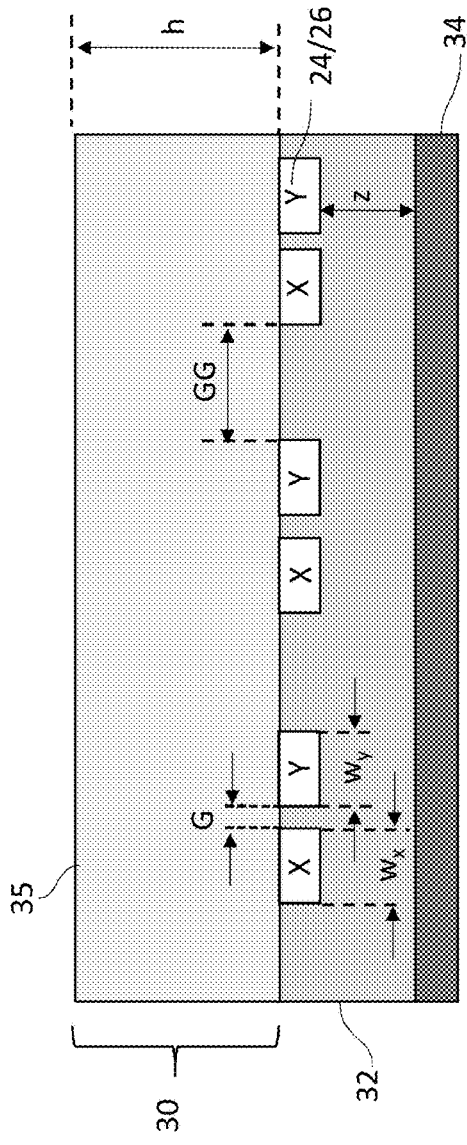
FIG. 9 is a schematic cross-section through a portion of interdigitating electrode portions according to another embodiment.

FIG. 9 is a schematic cross-section through a portion of interdigitating electrode portions according to another embodiment. A touch panel 30 of thickness 'h' has an upper side facing a touch surface 35 and a lower side which is an internal surface bonding to the layers below. The touch panel 30 is made of a dielectric material. A touch sensor electrode layer accommodating interdigitating X and Y electrode portions of X and Y electrodes 24 and 26 is arranged under the touch panel 30. Adjacent interdigitating portions of the X & Y electrodes have widths Wx and Wy respectively, where these electrode portions co-extend (out of the plane of the drawing) separated by a gap 'G' suitable for making a mutual capacitance measurement of a touching object impinging on the touch surface 35. The X & Y electrodes 24 and 26 are embedded in a dielectric layer 32, which is on top of a display 34 with the display 34 being separated from the touch sensor electrodes 24, 26 by a distance 'z'. In this embodiment, the co-extending X and Y electrode portions are arranged in pairs, i.e. groups of two, and each pair is separated by a group gap GG as illustrated. The group gaps are large enough to ensure there is substantially no mutual capacitance coupling contribution between adjacent pairs. It will be appreciated that the order of the sequence could be changed so that across the pair gap like electrode portions are next to each other, instead of opposite as illustrated. That is, if the illustration shows the sequence XY-XY-XY-XY etc. then an alternative is XY-YX-XY-YX etc. An arbitrary ordering would also be possible, e.g. XY-XY-YX-XY etc.

Figure 10:
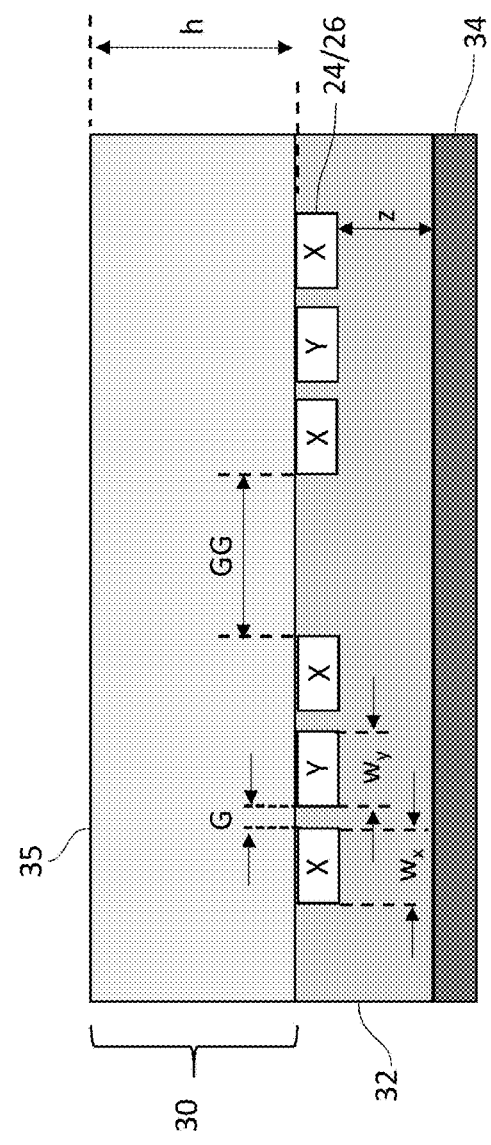
FIG. 10 is a schematic cross-section through a portion of interdigitating electrode portions according to a further embodiment.

FIG. 10 is a schematic cross-section through a portion of interdigitating electrode portions according to a further embodiment. A touch panel 30 of thickness 'h' has an upper side facing a touch surface 35 and a lower side which is an internal surface bonding to the layers below. The touch panel 30 is made of a dielectric material. A touch sensor electrode layer accommodating interdigitating X and Y electrode portions of X and Y electrodes 24 and 26 is arranged under the touch panel 30. Adjacent interdigitating portions of the X & Y electrodes have widths Wx and Wy respectively, where these electrode portions co-extend (out of the plane of the drawing) separated by a gap 'G' suitable for making a mutual capacitance measurement of a touching object impinging on the touch surface 35. The X & Y electrodes 24 and 26 are embedded in a dielectric layer 32, which is on top of a display 34 with the display 34 being separated from the touch sensor electrodes 24, 26 by a distance 'z'. In this embodiment, co-extending groups of electrode portions are arranged separate from other groups, each group being separated by a group gap GG as illustrated. The group gaps are large enough to ensure there is substantially no mutual capacitance coupling contribution between adjacent groups. It will be appreciated that the order of the sequence could be changed. For example, if the illustration shows the sequence XYX-XYX-XYX etc. then an alternative is YXY-YXY-YXY etc. An arbitrary ordering would also be possible, e.g. YXY-YXY-XYX-YXY etc.

It will also be appreciated that the groups may be bigger than the examples of 2 or 3 just described, and could be 4 or 5, or more, for example.

Figure 11:
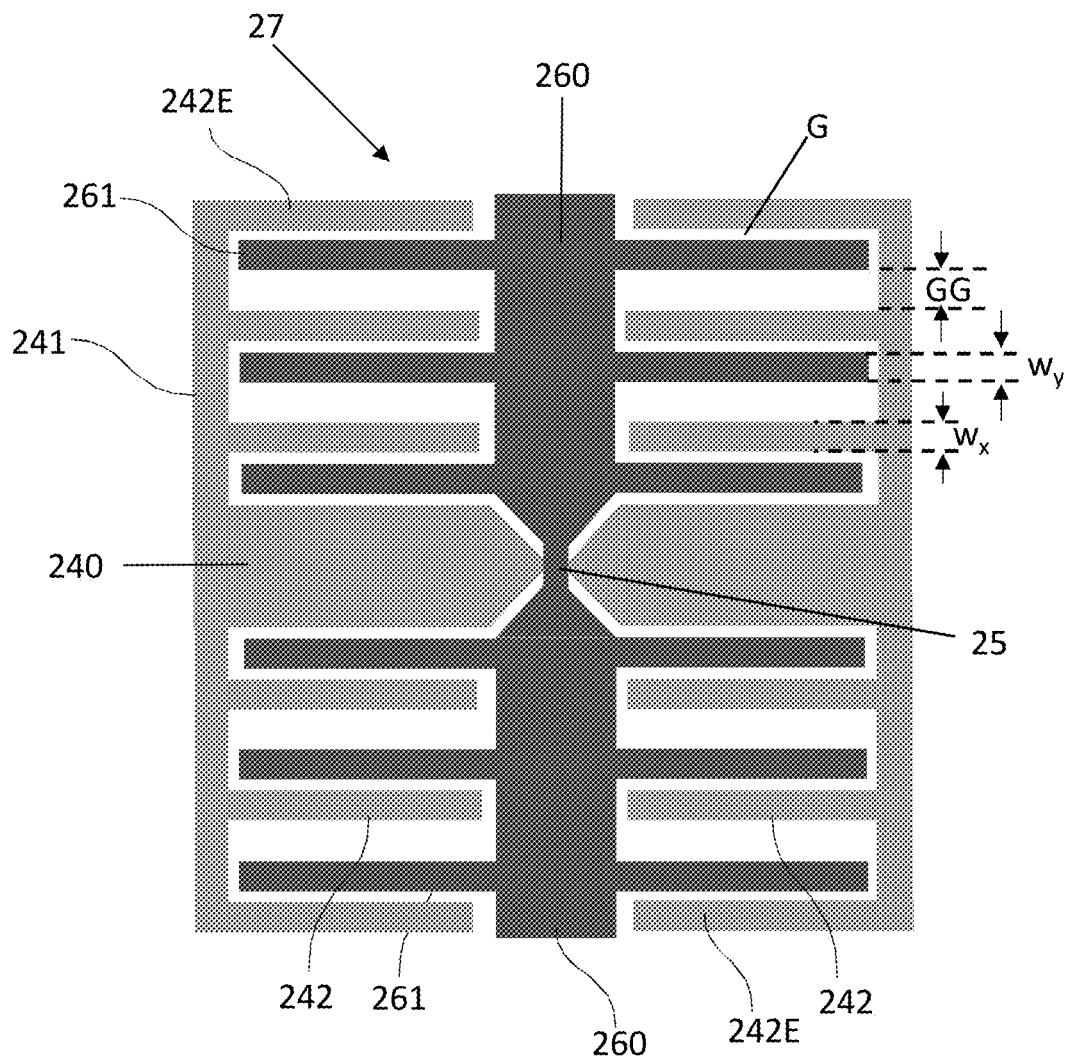
FIG. 11 is a schematic drawing in plan view of a portion of an electrode pattern according to an embodiment.

FIG. 11 is a schematic drawing in plan view of a portion of an electrode pattern according to an embodiment where the co-extending electrode portions are arranged in groups separated by group gaps GG as just described. It will be appreciated the illustrated pattern is a variant of that illustrated in FIG. 6.

Figure 12A:
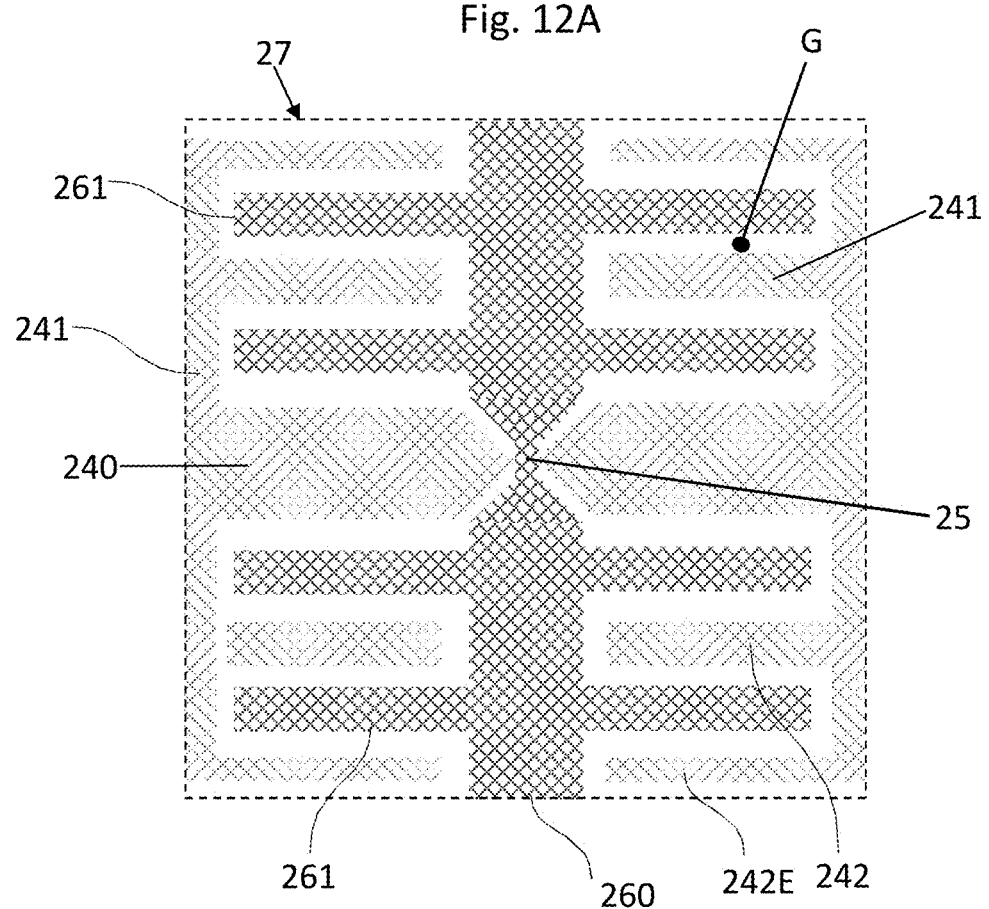
FIG. 12A is a schematic drawing in plan view of a portion of an electrode pattern according to an embodiment.

FIG. 12A is a schematic drawing in plan view of a portion of an electrode pattern according to an embodiment. The pattern at the macro level is the same as illustrated in FIG. 6. However, instead of having solid electrodes, i.e. electrodes each made of a continuous blanket of conductive material, the electrodes are made of a mesh of conductive material. It will be appreciated that the larger scale structure of this embodiment will look like FIG. 5 at the macro level.

Figure 12B:
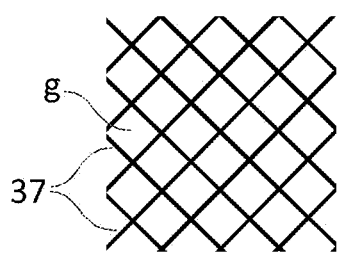
FIG. 12B shows a detail portion of FIG. 12A.

FIG. 12B shows a detail of the mesh of one of the electrodes of FIG. 12A, e.g. a small area of one of the X or Y electrode portions, from which it is evident that the mesh comprises criss-crossing continuous lines 37 of conductive material with gaps 'g' (micro-gaps) in between that are free of conductive material.

Figure 12C:
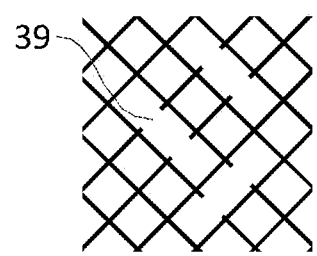
FIG. 12C shows an alternative detail portion of FIG. 12A.

FIG. 12C is a schematic drawing of a variant of the embodiment of FIGS. 12A and 12B in which not all the criss-cross lines of conductive material that make up the mesh are continuous. This variant is shown to illustrate the principle that the mesh of any given electrode or electrode branch needs to have a continuous conductive path overall in order to be part of the same electrode, but can include breaks or interruptions 39 formed by absence of individual length portions of the criss-crossing conductive lines that form the mesh structure.

More generally it is noted that any of the macro-level electrode patterns described herein can have part or all of their structure substituted with mesh, such as those shown in FIG. 12B and FIG. 12C. Moreover, if there are any isolated islands of conductive material in a given structure, these too can be formed of mesh.

By suitable choice of the sense electrode width and gap of co-extending electrode portions, it is possible to realise stacks which have full mitigation of signal inversion for touch panel thicknesses of less than at least one of: 300 µm, 250 µm, 200 µm, 150 µm or 100 µm and display proximity to the touch sensor electrodes of less than at least one of 600 µm, 500 µm, 400 µm, 300 µm, 200 µm or 100 µm, where this display proximity distance is referenced to the uppermost metallic display layer, e.g. VCOM layer or TFT drive electrodes as discussed below in connection with the stack examples, and the lower one of the X and Y (touch sensor) electrode layers in the case that the X and Y electrodes are not co-planar.

When designing a touch panel according to the teachings herein disclosed, the degree of signal inversion mitigation should be specified. For example, is the aim to completely preclude signal inversion for a touch of any size, i.e. from a small point touch to a touch that covers the whole touch sensitive area, or merely to preclude signal inversion for touches up to a certain size, or only for very large area touches? Alternatively, is the aim not to avoid signal inversion, but rather only partly offset its effects so that very large magnitudes of inverted signals do not arise, e.g. no bigger than the non-inverted signal magnitudes? One example specification would be to ensure the device dimensions are selected such that, in a mutual capacitance measurement, a large area touch, e.g. one covering at least twenty five contiguous array nodes, will cause a change in mutual capacitance as measured between the X and Y electrodes of the same sign regardless of the ground condition of the touch. Another example specification would be to ensure the device dimensions are selected such that, in a mutual capacitance measurement, a small area touch, that is one covering an area less than an area defined by a quadrilateral of four adjacent array nodes, causes a change in mutual capacitance as measured between the X and Y electrodes of the same sign regardless of the ground condition of the touch. The touch area against which the design is specified may be in absolute terms, e.g. to correspond to the size of a finger touch (e.g. 4, 5, 6, 7, 8, 9, 10, 11, 12, 13, 14 or 15 mm diameter circle), or a touch by another touching body (e.g. stylus, brush) with which the device is designed to operate. The specification could also include a definition of the floating touch being considered, e.g. in terms of its self capacitance value to the display.

It is also noted that although the problem of signal inversion has been discussed in connection with the effect of arranging a display close to a touch sensor in a touch screen, the same effect could in principle occur in other situations where a metallic layer is arranged under a capacitive touch sensor, for example with a CCD chip or other image sensor with electrodes that is arranged under a touch sensor.

Stack Configurations

By way of example the following figures show various specific stack implementations for LCD and OLED touch screens. In these implementations, it will be appreciated that one or more adhesive layers (e.g., OCA) may be used to bind layers of the display and touch sensor stack together, but these are not illustrated. Moreover, in these implementations, it will be understood that the touch panel is optically transparent in the visible region in order to be suitable for display applications and is made of a resilient material suitable for acting as the touch surface, such as for example a suitable glass or plastics material. Suitable plastics materials include polycarbonate (PC) and polymethyl methacrylate (PMMA). Further, it will be understood that embodiments may also be realised with other stack implementations, such as for example those described in US 2014/226089 A1 (Atmel Corporation) and US 2016/259481 A1 (LG Electronics, Inc.), the entire contents of which are incorporated herein by reference.

In the following figures, the touch panel is disclosed as one layer of the stack. It will be appreciated that the touch panel comprises the touch panel glass or plastics layer, optionally a top hard coat for anti-scratch, and other layers, such as an OCA layer to adhere to the underside of the touch panel to the adjacent layer of the stack.

Figure 13:
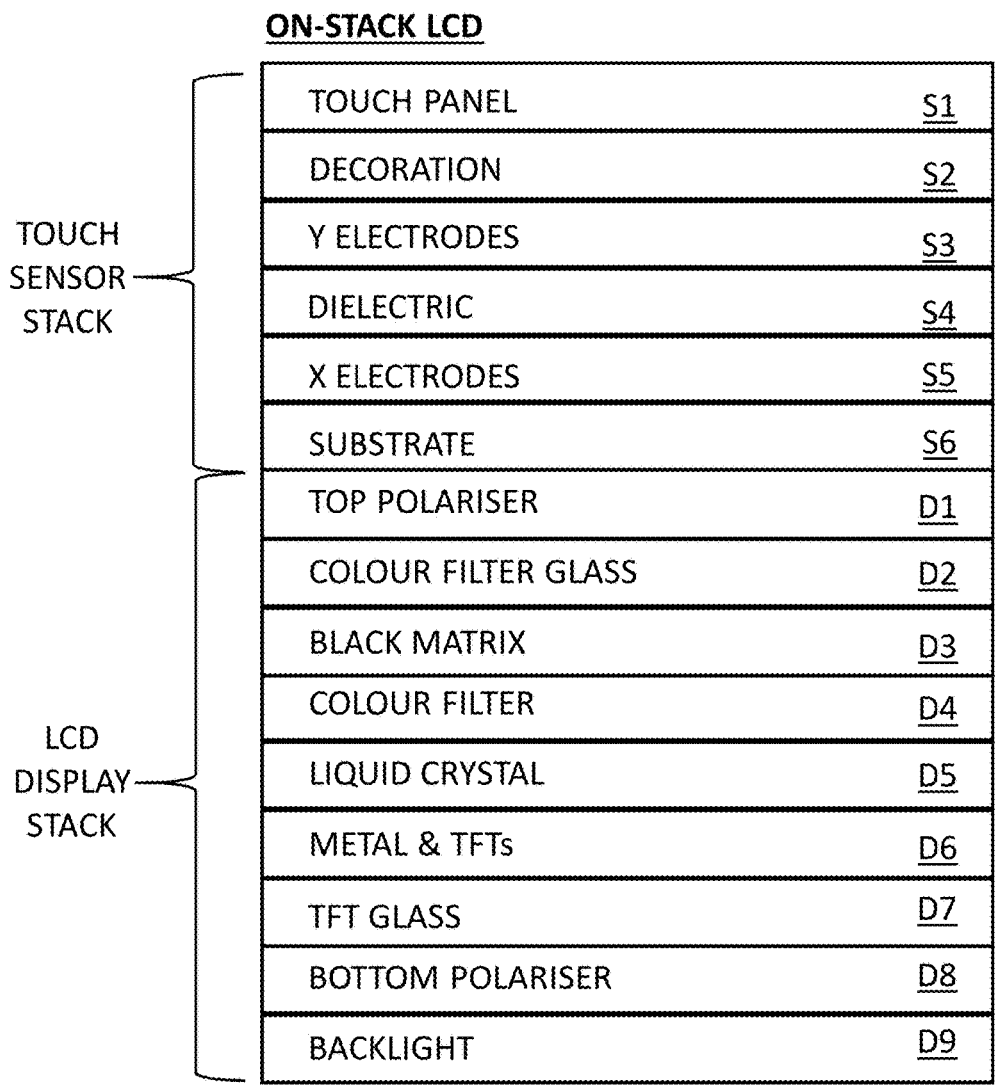
FIG. 13 shows a sensor and display stack of an on-stack LCD embodiment of the disclosure.

FIG. 13 shows a sensor and display stack of an on-stack LCD embodiment of the disclosure. An on-stack design refers to the fact that the touch sensor is arranged on top of and is a separate sub-assembly from the display, each operating effectively independently. The LCD display stack starts with a backlight unit, then a bottom polariser and a glass layer to act as a substrate for the thin film transistors (TFTs). The TFTs together with their addressing and other electrodes, referred to as metal, are arranged in top of the TFT glass. It will be understood that reference to metal includes any suitable metallically conductive material, it often being the case that ITO is used (i.e. a non-metal), since it is transparent and therefore suitable for display applications. For other applications, the electrode material may be opaque. The next layer is the liquid crystal layer followed by a colour filter layer. It will be appreciated that suitable spacers will be provided to maintain a design thickness for the liquid crystal layer. Next there is a black matrix layer for contrast enhancement, colour filter glass, and finally a top polariser. It will be appreciated that additional layers, such as adhesive, coatings and so forth may also be included as desired. Moreover, some of the recited layers could be omitted, for example the black matrix. A simpler structure would also result if the display was monochrome. The touch sensor stack is arranged on top of the display stack and commences with a substrate, made of a material such as a glass material (e.g. an alkali aluminosilicate glass) or a plastics material (e.g. PET) for example, on which the X electrodes are deposited. The X electrodes may be embedded in a dielectric matrix, such as an adhesive layer. On top of the X electrodes there is a dielectric and then the Y electrodes. It will be appreciated that in a single layer design, the substrate would be the dielectric and the X & Y electrodes would be arranged thereon, thereby removing two of the illustrated layers. There then follows an optional decoration layer. Finally, there is a touch panel 30.

Figure 14:
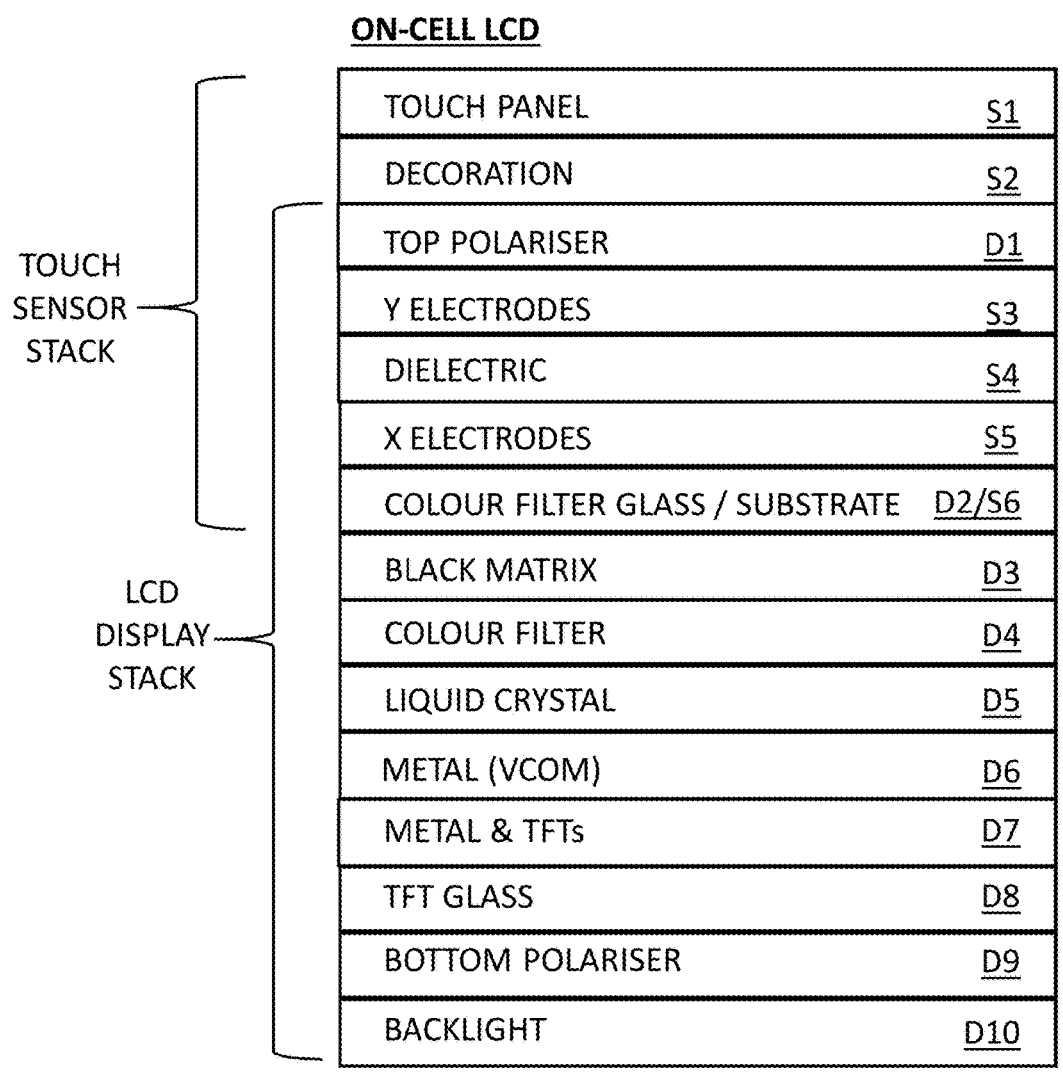
FIG. 14 shows a sensor and display stack of an on-cell LCD embodiment of the disclosure.

FIG. 14 shows a sensor and display stack of an on-cell LCD embodiment of the disclosure. The term on-cell refers to the fact that the touch sensor uses the uppermost display stack layer, namely the colour filter glass, as the substrate for the initial layer of the sensor stack, namely the X electrodes. Compared with the on-stack design of FIG. 13, the only other change is that the top polariser has been moved to be above the touch sensor layers for the X and Y electrodes which has the effect of reducing the visibility of the electrode pattern.

Figure 15:
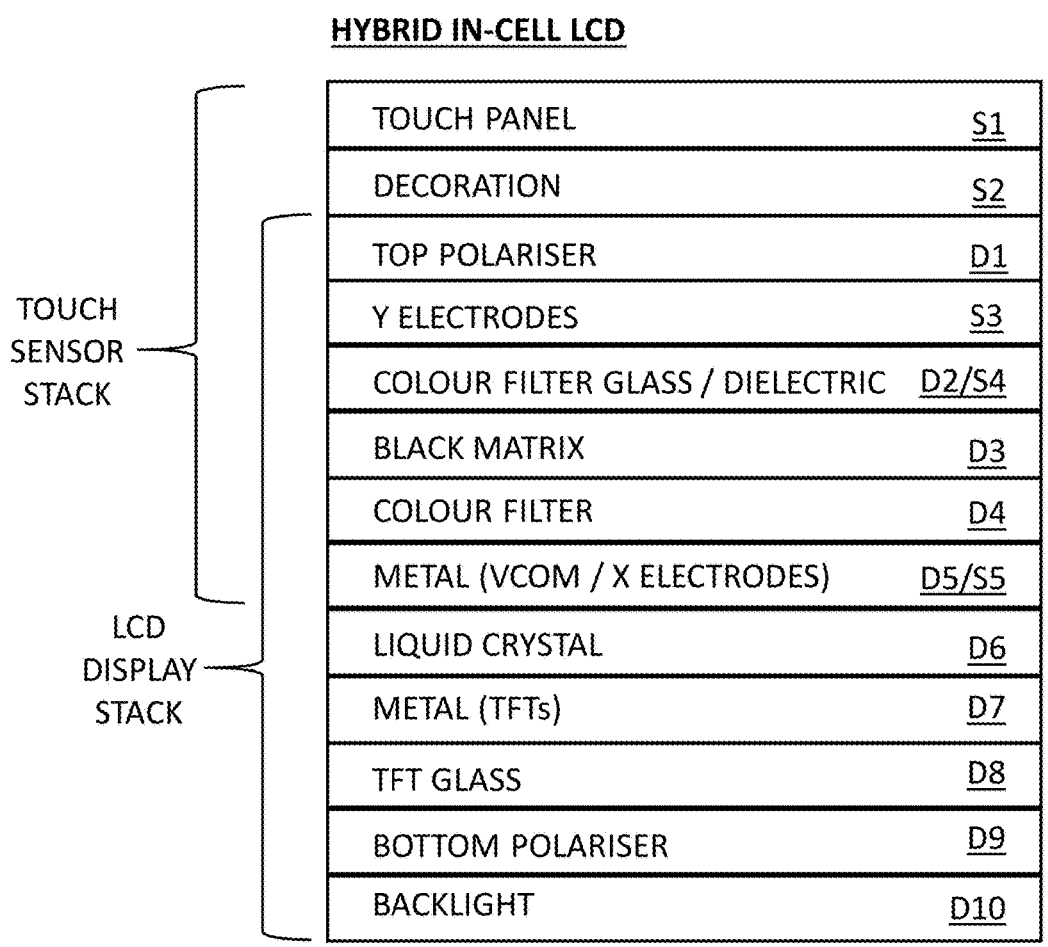
FIG. 15 shows a sensor and display stack of a hybrid in-cell LCD embodiment of the disclosure.

FIG. 15 shows a sensor and display stack of a hybrid in-cell LCD embodiment of the disclosure. The term in-cell refers to the fact that the touch sensor is more fully integrated within the display stack in that at least one of the touch sensor layers is arranged below the display's colour filter. In particular, some of the display driver electrodes (the VCOM electrodes that provide a reference voltage for the TFTs) can perform a dual function as touch sensor electrodes (the X electrodes), their functional separation being achieved by time multiplexing, i.e. for part of a cycle the electrodes are used for the display and for another part of the cycle for touch sensing. The dual function is achieved by patterning the VCOM electrode layer, which in an LCD without touch sensor is simply an unstructured blanket. For in-cell designs, there are two possibilities: "one-sided" in-cell if both X and Y sensor electrode layers below the colour filter glass, and "two-sided" or "hybrid" in-cell if only one of the X and Y sensor electrode layers moves below the colour filter glass. In a hybrid in-cell design, the electrode layer above the colour filter glass, nearest to the touch panel, will be the layer used for sense (i.e. Y electrode) in a mutual capacitance measurement. It will be appreciated that in an in-cell design, the electronics driving the display and the touch sensor need to be coordinated, so that either one single IC is provided for jointly controlling the display and touch sensor, or, if dedicated display and touch-sensor controller ICs are retained, they need to exchange data to ensure coordination.

Figure 16:
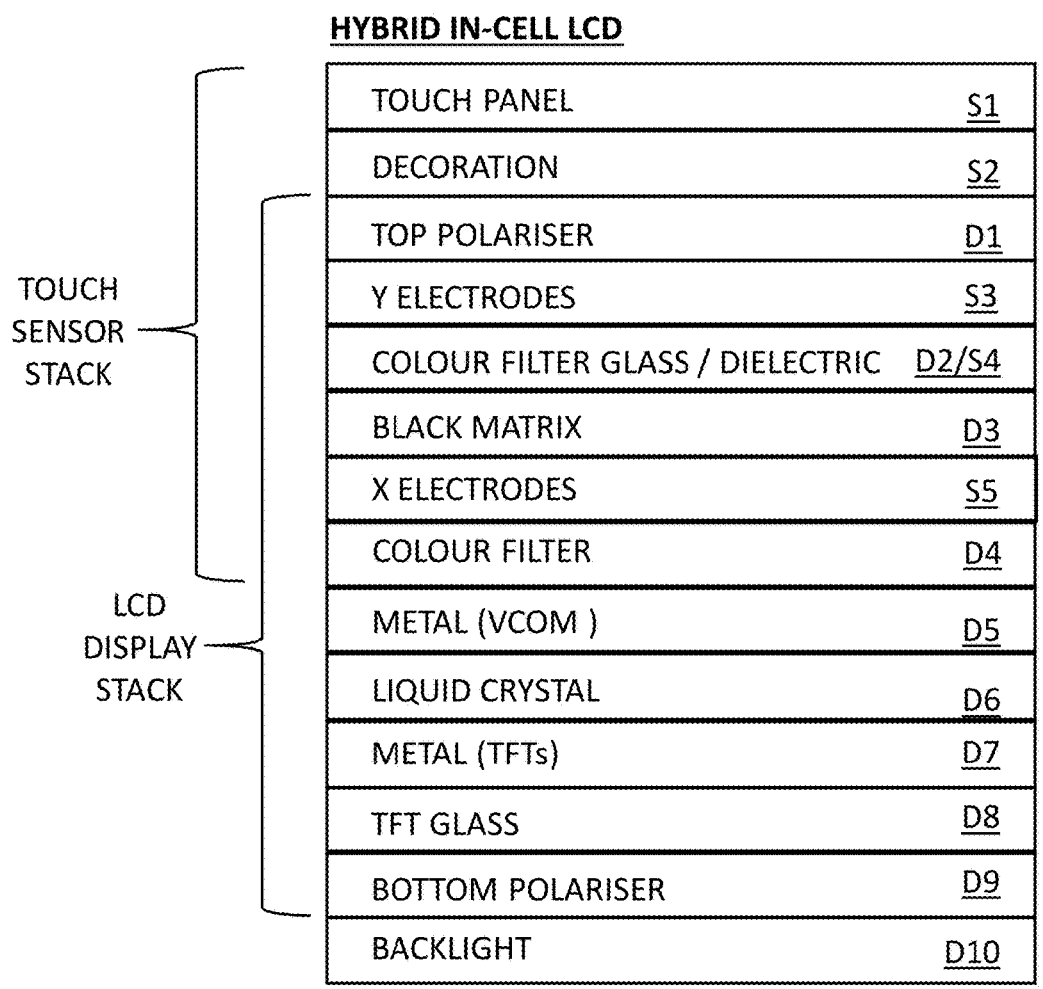
FIG. 16 shows a sensor and display stack of another hybrid in-cell LCD embodiment of the disclosure.

FIG. 16 shows a sensor and display stack of another hybrid in-cell LCD embodiment of the disclosure. In comparison to the stack of FIG. 15, the X electrodes are not integrated with the VCOM so that capacitive sensing measurements can take place in parallel with driving the display. The X electrodes are arranged on the colour filter. It is illustrated that the X electrodes are arranged on the upper side of the colour filter, but they could be arranged on the lower side. Moreover, a separate substrate layer for supporting the X electrodes could be provided.

Figure 17:
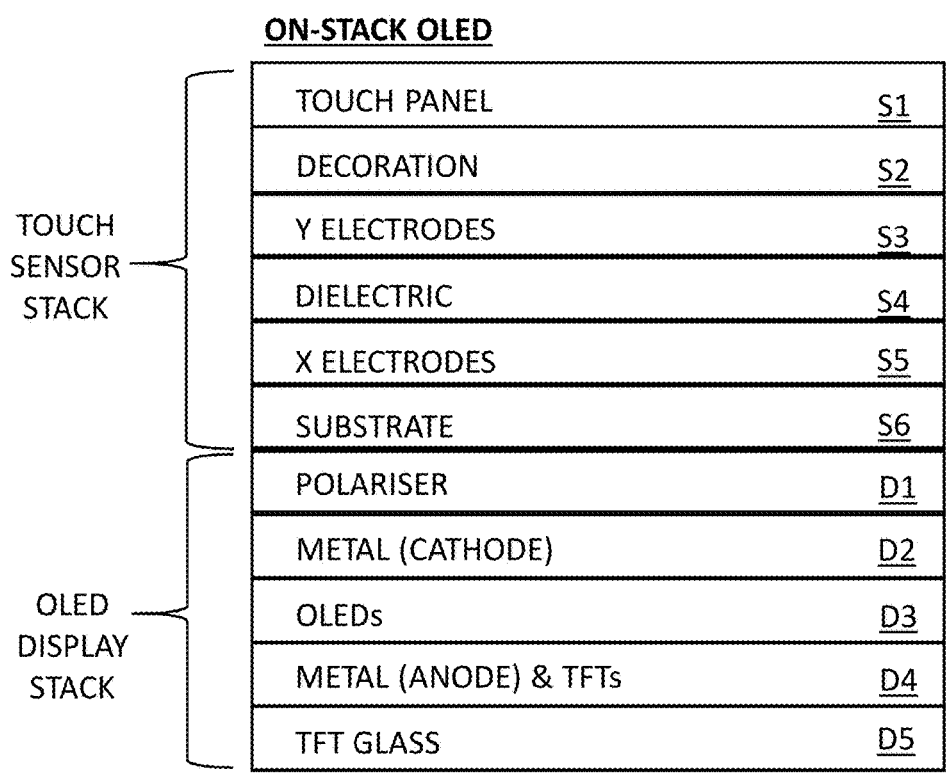
FIG. 17 shows a sensor and display stack of an on-stack OLED embodiment of the disclosure.

FIG. 17 shows a sensor and display stack of an on-stack OLED embodiment of the disclosure. The OLED display stack starts with a glass layer to act as a substrate for the thin film transistors (TFTs). The TFTs together with their addressing and other electrodes, referred to as metal, are arranged in top of the TFT glass. The metal in this layer includes metal for anode electrodes for driving the OLEDs. Next there follows the OLED layer and another metal layer for the OLEDs cathodes. It will be appreciated that anode and cathode layers could be reversed. Finally, the display stack is completed by a polariser. For an OLED, it is noted that generally a colour filter and colour filter glass is not needed. However, for white OLEDs, they may be provided in which case those layers would be arranged above the OLEDs and below the metal (cathode) layer. It will also be appreciated that additional layers, such as adhesive, coatings and so forth may also be included as desired. The touch sensor stack is arranged on top of the display stack's cathode electrode layer and commences with a substrate on which the X electrodes are deposited. The X electrodes may be embedded in a dielectric matrix, such as an adhesive layer. On top of the X electrodes there is a dielectric and then the Y electrodes. There then follows an optional decoration layer. The final layers are those of the touch panel 30.

Figure 18:
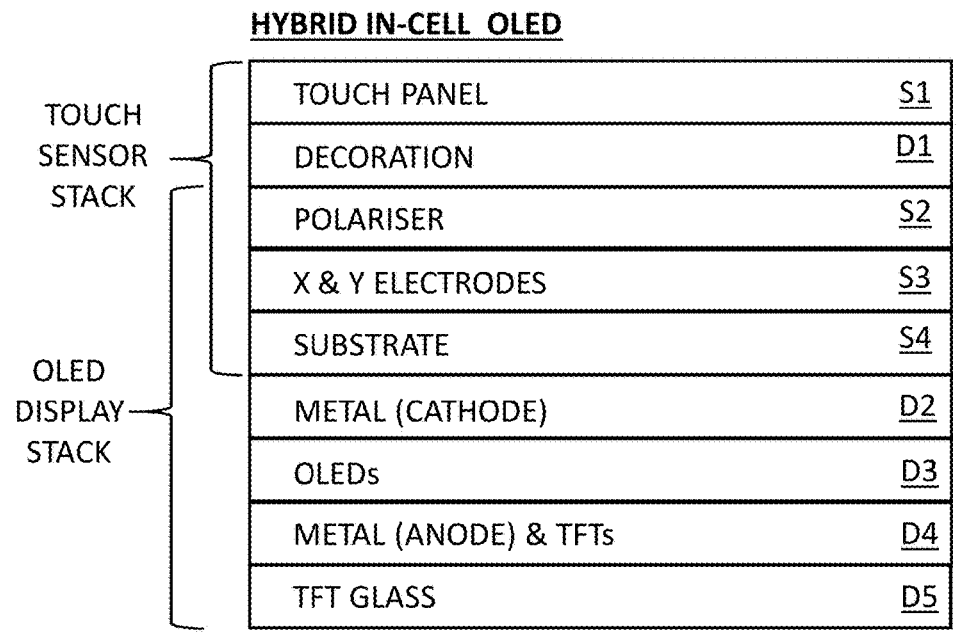
FIG. 18 shows a sensor and display stack of a hybrid in-cell OLED embodiment of the disclosure.

FIG. 18 shows a sensor and display stack of a hybrid in-cell OLED embodiment of the disclosure. The OLED display stack starts with a glass layer to act as a substrate for the thin film transistors (TFTs). The TFTs together with their addressing and other electrodes, referred to as metal, are arranged in top of the TFT glass. The metal in this layer includes metal for anode electrodes for driving the OLEDs. Next there follows the OLED layer and another metal layer for the OLEDs cathodes. It will be appreciated that anode and cathode layers could be reversed. The display stack is completed by a polariser, but in this embodiment the polariser is arranged above the touch sensor electrodes. Placing the polariser above the touch sensor electrodes has the advantage that the polariser partly obscures the pattern of the touch sensor electrodes, which would otherwise be more visible to a user under a wider variety of lighting conditions and angles of view. It will also be appreciated that additional layers, such as adhesive, coatings and so forth may also be included as desired. A slightly different structure could also result if the display was monochrome. Touch sensor stack layers are arranged on top of the display stack's cathode layer. The first touch sensor stack layer is a substrate. The X & Y electrodes are then formed in a single layer, and may be embedded in a dielectric matrix, such as an adhesive layer. There then follows the above-mentioned polariser for the display stack an optional decoration layer. Finally, there is the touch panel 30. Some common variations to this stack are as follows. We also note that the general comments on in-cell designs made in relation to the above hybrid in-cell LCD embodiments also apply to this in-cell OLED embodiment.

Figure 19:
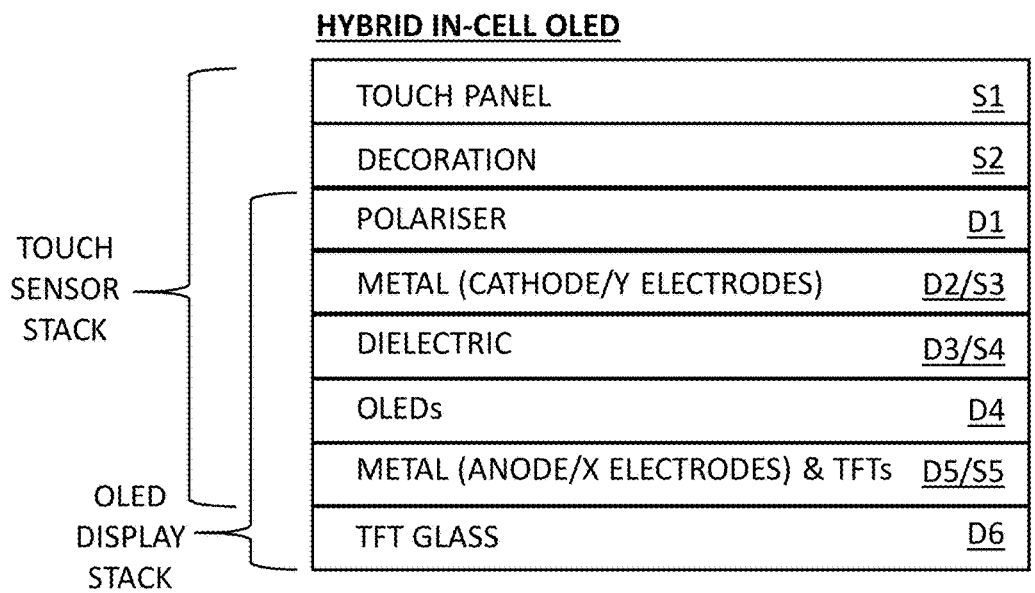
FIG. 19 shows a sensor and display stack of another hybrid in-cell OLED embodiment of the disclosure.

FIG. 19 shows a sensor and display stack of another hybrid in-cell OLED embodiment of the disclosure. The layer structure starts with a glass layer for acting as a substrate for the subsequent TFT layer which includes the TFTs and their drive electrodes, including dual function electrodes which serve as the VCOM electrodes for the OLEDs providing a reference voltage for the TFTs and the X electrodes for touch sensing. There then follows the OLED layer. A dielectric layer then follows which serves as a substrate for another metal layer comprising dual purpose electrodes to act as the cathodes for the OLEDs and the Y electrodes for sense in the touch sensor. The stack is completed with: the polariser for the display, an optional decoration layer and the touch panel 30. We also note that the general comments on in-cell designs made in relation to the above hybrid in-cell OLED embodiment and in-cell LCD embodiments also apply to this in-cell OLED embodiment.

It will be appreciated that the touch sensor stack of any of the on-stack embodiments may form the basis for further embodiments which do not include a display, i.e. stand-alone touch sensors, such as a touchpad of a laptop computer, or a touch-sensitive rear housing panel of a mobile phone.

Moreover, in any of the example stacks, the X and Y electrode layers could be swapped. Further, in any of the example stacks, the X and Y electrode layers could be arranged in a single layer.

A touch screen computing device (or touch sensor device without screen) as presented herein may for example be a mobile phone (smartphone), phablet, tablet including specialist drawing tablet, laptop computer, personal computer, smart television, media player, satellite navigation device, games console, kiosk computer, or point-of-sale device. The device may be a user equipment as defined by one or more telecommunications standards. The device may be portable, e.g. a handheld computing device, or fixed. The touch screen (or touch sensor without screen) may form part of a household appliance or other appliance.

Device Context Description

FIG. 20A and FIG. 20B are schematic perspective views from the front and behind of a handheld touch screen computing device.

FIG. 21 is a block diagram of the functional components of the computing device of FIG. 20A and FIG. 20B.

Referring to FIG. 20A, the computing device 100 has a smartphone or tablet format. The computing device 100 is arranged in a housing with a front face (facing outwards from FIG. 20A), a rear face and a bezel forming the edges of a substantially rectilinear object. The front face is mostly taken up with a touch screen display which combines a display 102 (shown displaying a scene with house, smoke and sun) with a touch sensitive area 103 (shown with the hatching). The touch screen enables the user to input commands to applications running on the computing device through gestures, which vary from the humble single touch of a point on the display to select it, referred to in the art as a tap, and other single touch gestures, such as a swipe, through to multitouch gestures such as the two-finger pinch conventionally used for zooming in and out and rotating. We note that in this document references to gestures means touch gestures on a touch screen. The front face also accommodates a mechanical key (or button) 104 and two touch sensor keys (or buttons) 106, 108, on either side of the mechanical key 104. The edges of the housing accommodate a mechanical rocker switch 110 for volume control and an on/off switch 112. There is also a haptic layer embedded in the touch screen 102 to provide tactile feedback (not shown).

A front facing camera 101 for capturing stills or video images is arranged on the front face near the top of the housing facing forwards and has adjacent to it a microphone 105 for capturing audio and a speaker 107 for outputting audio.

Referring to FIG. 20B, the rear view, a rear facing camera 114 for capturing stills or video images is arranged near the top of the housing facing backwards. A battery 116 is accommodated within the housing and constitutes a power supply (shown with dashed lines). The power supply further includes an external power input socket 118 which may be used for powering the device as well as charging the battery. Alongside the power input socket 118 at the bottom of the device there is another external connector in the form of an audio jack 120 for audio output. Further external interfaces may be provided including various ports, holders and sockets for physical connections. With dotted lines we show two internal holders 122, 124 which may be for a SIM card and a memory card or further SIM card. The memory card is a kind of data storage device.

Referring to FIG. 21, this shows selected functional components of the computing device 100. The computing device 100 has radio components 130, input/output (I/O) components 140, one or more controllers 150 associated with one or more processors 160 and one or more memories 170, a power supply 180, sensor components 190 and external interfaces 200. The memory 170 is operable to store computer applications ('apps') 162 which comprise software code portions that are loadable into and executable by the processor 160. The controller(s) 150 may include a touch-sensor controller and a display controller, or a combined touch and display controller.

The processor(s) may comprise separate processing units for specialist tasks such as touch sensing, display drive, video processing, speech/audio analysis and/or speech/audio synthesis. The controller(s) and associated processor(s) and memory(ies) have the task of controlling the computing device and executing computer programs stored in the memory(ies). The memory(ies) may store computer applications for running on the computing device as well as collecting data from the various I/O devices. The controller(s) typically functions to control overall operation of the computing device, in addition to the operations associated with the application programs. The controller(s) processes signals, data, information and the like input or output through the above-mentioned components and/or runs application programs saved in the memory, thereby processing or providing a user with appropriate information and/or functions.

The radio components 130 includes a WLAN transceiver, an LTE transceiver, and a GPS module. The I/O components 140 include a display capable of displaying content and also acting as part of a graphical user interface, wherein the display may be based on a suitable technology such as liquid crystal or organic light emitting diodes, as well as a position-sensitive touch sensor area overlaid on, or formed as an integral part of, the display to serve as part of a graphical user interface in conjunction with the display with optionally other touch sensor areas or buttons (e.g. on the reverse side or edge (bezel) of the device housing). Further I/O components, as previously mentioned, are front and rear facing cameras for capturing stills or video images, a microphone for capturing audio, a speaker for outputting audio and a haptic output embedded in the touch screen to provide tactile feedback. The sensing components include a gyroscope, an accelerometer, an ambient light sensor, a magnetic field sensor and a temperature sensor, for example. The external interfaces may include various ports and sockets for physical connections, such as a SIM card, wired LAN connectors, memory cards, audio jack socket, USB ports and so forth.

Method

Figure 22:
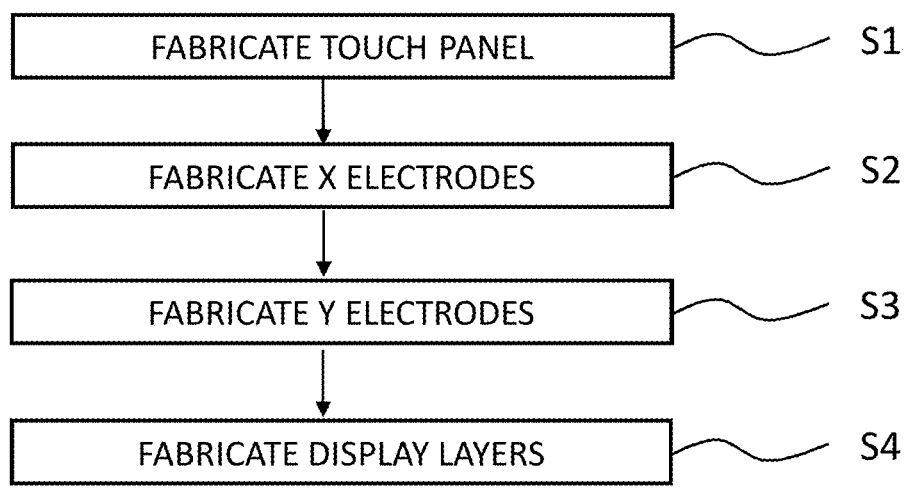
FIG. 22 is a flow chart showing a method of manufacturing a device incorporating a capacitive touch sensor according to an embodiment.

FIG. 22 is a flow chart showing a method of manufacturing a device incorporating a capacitive touch sensor. Step S1 involves fabricating a touch panel having on an upper side a touch surface and on a lower side an internal surface, the touch panel being made of a dielectric material and having a thickness, h. Steps S2 and S3 involve fabricating X and Y touch sensor electrodes arranged under the touch panel so as to cross each other at crossing points to form a two-dimensional array of nodes, the X and Y electrodes at each node comprising mutually co-extending X and Y electrode portions of respective widths, Wx and Wy, that are separated by a gap, G, suitable for making a mutual capacitance measurement of a touching object impinging on the touch surface, wherein the width, Wy, of the co-extending Y electrode portions plus the gap, G, between co-extending X and Y electrode portions is less than or equal to one of: 4, 3 or 2 times the thickness, h of the touch panel. Optional Step S4 involves fabricating a display comprising display electrodes to form a single stack with the capacitive touch sensor and thereby form a touch screen. It will be understood that the X and Y electrode layers could be one and the same layer, or separate layers.

It will be clear to one skilled in the art that many improvements and modifications can be made to the foregoing exemplary embodiment without departing from the scope of the present disclosure.

The invention claimed is:

1. A device incorporating a capacitive touch sensor, the device comprising:
a touch panel having on an upper side a touch surface and on a lower side an internal surface, the touch panel being made of a dielectric material and having a thickness, h, of less than or equal to 400 micrometers;
drive and sense touch sensor electrodes, X and Y, arranged under the touch panel so as to cross each other at crossing points to form a two-dimensional array of nodes, the X and Y electrodes of each node comprising mutually co-extending X and Y electrode portions of respective widths, Wx and Wy, that are separated by a gap, G, suitable for making a mutual capacitance measurement of a touching object impinging on the touch surface,
wherein the width, Wy, of the co-extending Y electrode portions plus the gap, G, between co-extending X and Y electrode portions is less than or equal to 4 times the thickness, h, of the touch panel,
wherein at each node the co-extending X and Y electrode portions separated by the gap G are arranged in groups, each group being separated by a distance of at least one of 2, 3, 4 or 5 times the gap G, so that the mutual capacitance between groups is smaller than the mutual capacitance within groups.

2. The device of claim 1, wherein the width, Wx, of the co-extending X electrode portions is within a range of at least one of: ⅕ to 5 times; ¼ to 4 times; ½ to 2 times the width Wy of the co-extending Y electrode portions.

3. The device of claim 1, wherein the thickness, h, of the touch panel is less than or equal to at least one of: 350, 300, 250, 200, 150 or 100 micrometers.

4. The device of any preceding claim, further comprising a display configured to operate in conjunction with the capacitive touch sensor and thereby form a touch screen.

5. The device of claim 4, wherein the display has electrode layers and is arranged such that the uppermost one of the display electrode layers is separated from the lower of the X and Y electrode layers by a distance of less than or equal to one of 600, 500, 400, 300, 200 and 100 micrometers.

6. The device of claim 1, wherein the X and Y electrodes further comprise co-extending higher order X and Y electrode portions comprising at least one of first, second and third order branches of one of the X and Y electrodes and at least one of first, second and third order branches of one of the Y and X electrodes respectively.

7. The device of claim 1, wherein the thickness of the touch panel, the widths of the co-extending X and Y electrode portions and the gap between co-extending X and Y electrode portions are selected such that, in a mutual capacitance measurement, a large area touch, that is one covering at least twenty five contiguous array nodes, causes a change in mutual capacitance as measured between the X and Y electrodes of the same sign regardless of the ground condition of the touch.

8. The device of claim 1, wherein the thickness of the touch panel, the widths of the co-extending X and Y electrode portions and the gap between co-extending X and Y electrode portions are selected such that, in a mutual capacitance measurement, a small area touch, that is one covering an area less than an area defined by a quadrilateral of four adjacent array nodes, causes a change in mutual capacitance as measured between the X and Y electrodes of the same sign regardless of the ground condition of the touch.

9. The device of claim 1, wherein the X and Y electrodes are made of a conductive material and represent a macrostructure, and wherein the conductive material within at least portions of the X and Y electrodes has a microstructure formed of a mesh of the conductive material with microareas absent of the conductive material in the mesh.

10. The device of claim 1, wherein:
the X electrodes comprise zeroth order branches extending in the x direction;
the Y electrodes comprise zeroth order branches extending in the y direction, such that it is the zeroth order branches of the X and Y electrodes which cross each other, and such that the zeroth order branches of any two adjacent X electrodes and any two adjacent Y electrodes enclose a sub-area; and
the X and Y electrodes each further comprising higher order branches of order n, each of which is confined to the sub-area into which it buds, where order n is a positive integer and where an nth order branch buds from an (n−1)th order branch, so that, away from edges of the node array, each node is associated with four sub-areas, and wherein, in each sub-area, the co-extending X and Y electrode portions are at least in part formed by at least some of the higher order X electrode branches and at least some of the higher order Y branches.

11. The device of claim 10, wherein, in each sub-area, at least four higher order X and at least four higher order Y branches extend alongside one another separated by a gap suitable for making a mutual capacitance measurement of a touching object impinging on the touch surface.

12. The device of claim 11, wherein, in each sub-area, at least one of 5, 6, 7, 8, 9 and 10 higher order X and at least one of 5, 6, 7, 8, 9 and 10 higher order Y branches extend alongside one another separated by a gap suitable for making a mutual capacitance measurement of a touching object impinging on the touch surface.

13. The device of claim 1, wherein the width, Wy, of the co-extending Y electrode portions plus the gap, G, between co-extending X and Y electrode portions is less than or equal to one of 3 or 2 times the thickness, h, of the touch panel.

14. A method of manufacturing a device incorporating a capacitive touch sensor, the method comprising:
fabricating a touch panel having on an upper side a touch surface and on a lower side an internal surface, the touch panel being made of a dielectric material and having a thickness, h, of less than or equal to 400 micrometers; and
fabricating X and Y touch sensor electrodes arranged under the touch panel so as to cross each other at crossing points to form a two-dimensional array of nodes, the X and Y electrodes of each node comprising mutually co-extending X and Y electrode portions of respective widths, Wx and Wy, that are separated by a gap, G, suitable for making a mutual capacitance measurement of a touching object impinging on the touch surface,
wherein the width, Wy, of the co-extending Y electrode portions plus the gap, G, between co-extending X and Y electrode portions is less than or equal to 4 times the thickness, h of the touch panel,
wherein at each node the co-extending X and Y electrode portions separated by the gap G are arranged in groups, each group being separated by a distance of at least one of 2, 3, 4 or 5 times the gap G, so that the mutual capacitance between groups is smaller than the mutual capacitance within groups.

15. The method of claim 14, further comprising:
fabricating a display comprising display electrodes to form a single stack with the capacitive touch sensor and thereby form a touch screen.

16. The method of claim 15, wherein the display has electrode layers and is arranged such that the uppermost one of the display electrode layers is separated from the lower of the X and Y electrode layers by a distance of less than or equal to one of 600, 500, 400, 300, 200 and 100 micrometers.

17. The method of claim 14, wherein the thickness, h, of the touch panel is less than or equal to at least one of 350, 300, 250, 200, 150 or 100 micrometers.

18. The method of claim 14, wherein the width, Wy, of the co-extending Y electrode portions plus the gap, G, between co-extending X and Y electrode portions is less than or equal to one of 3 or 2 times the thickness, h, of the touch panel.

19. The method of claim 14, wherein the width, Wx, of the co-extending X electrode portions is within a range of at least one of: ⅕ to 5 times; ¼ to 4 times; ½ to 2 times the width Wy of the co-extending Y electrode portions.

20. The method of claim 14, wherein the X and Y electrodes further comprise co-extending higher order X and Y electrode portions comprising at least one of first, second and third order branches of one of the X and Y electrodes and at least one of first, second and third order branches of one of the Y and X electrodes respectively.

21. The method of claim 14, wherein the X and Y electrodes are made of a conductive material and represent a macrostructure, and wherein the conductive material within at least portions of the X and Y electrodes has a microstructure formed of a mesh of the conductive material with micro-areas absent of the conductive material in the mesh.

22. The method of claim 14, wherein:
the X electrodes comprise zeroth order branches extending in the x direction;
the Y electrodes comprise zeroth order branches extending in the y direction, such that it is the zeroth order branches of the X and Y electrodes which cross each other, and such that the zeroth order branches of any two adjacent X electrodes and any two adjacent Y electrodes enclose a sub-area; and
the X and Y electrodes each further comprising higher order branches of order n, each of which is confined to the sub-area into which it buds, where order n is a positive integer and where an nth order branch buds from an (n−1)th order branch, so that, away from edges of the node array, each node is associated with four sub-areas, and wherein, in each sub-area, the co-extending X and Y electrode portions are at least in part formed by at least some of the higher order X electrode branches and at least some of the higher order Y branches.

* * * * *